(12) United States Patent
Sekoguchi

(10) Patent No.: US 8,718,984 B2
(45) Date of Patent: May 6, 2014

(54) MINUTE FLOW RATE CONTROLLER WITH ENTRANCE THROTTLE GROOVE

(75) Inventor: Kotohiko Sekoguchi, Ikeda (JP)

(73) Assignees: Fujikin Incorporated, Osaka (JP); Kotohiko Sekoguchi, Osaka (JP)

( * ) Notice: Subject to any disclaimer, the term of this patent is extended or adjusted under 35 U.S.C. 154(b) by 1233 days.

(21) Appl. No.: 12/448,569

(22) PCT Filed: Dec. 28, 2006

(86) PCT No.: PCT/JP2006/326205
§ 371 (c)(1),
(2), (4) Date: Jun. 25, 2009

(87) PCT Pub. No.: WO2008/081530
PCT Pub. Date: Jul. 10, 2008

(65) Prior Publication Data
US 2009/0294720 A1    Dec. 3, 2009

(51) Int. Cl.
*G06F 7/60* (2006.01)
*G06F 17/10* (2006.01)

(52) U.S. Cl.
USPC .................................................. 703/2

(58) Field of Classification Search
None
See application file for complete search history.

(56) References Cited

U.S. PATENT DOCUMENTS

| | | | | |
|---|---|---|---|---|
| 4,011,893 A | * | 3/1977 | Bentley | 138/43 |
| 4,860,594 A | * | 8/1989 | Hammond et al. | 73/861.42 |
| 4,923,115 A | * | 5/1990 | Sekoguchi et al. | 236/12.11 |

FOREIGN PATENT DOCUMENTS

| | | |
|---|---|---|
| JP | 2001-187977 | 7/2001 |
| JP | 2003-278934 | 10/2003 |
| JP | 2006-153140 | 6/2006 |
| JP | 2006-153141 | 6/2006 |

* cited by examiner

*Primary Examiner* — Omar Fernandez Rivas
*Assistant Examiner* — Bernard E Cothran
(74) *Attorney, Agent, or Firm* — DLA Piper LLP (US)

(57) ABSTRACT

With respect to a minute flow rate controller comprising inflow passage (12) for introducing a fluid, valve member (2) furnished with main throttle groove (6) for causing the introduced flow to flow from a starting end toward a finishing end thereof, fluid outflow port (20) opened with an optional cross section by a flow rate regulating member and outflow passage (14) for leading out the fluid flowing out from the fluid outflow port (20), there is provided a method of designing the controller with entrance throttle groove, comprising providing the entrance throttle groove (8) communicably preceding the starting end position of the main throttle groove (6), and, on the basis of a relational expression derived from the momentum equation of the fluid flowing through the groove (8) and the main throttle groove (6), determining the size of the groove (8) so as to exhibit a desired flow resistance.

7 Claims, 23 Drawing Sheets

Fig.7

$$\rho u \frac{du}{dz} + \frac{1}{2}\lambda \frac{\rho u^2}{D_H} + \frac{dP}{dz} = 0 \qquad (1-1)$$

$$\frac{G^2}{A}d\left(\frac{1}{\rho A}\right) + \frac{32\mu G}{\rho A D_H^2}dz + dP = 0 \qquad (1-2)$$

$$G_M^2 \int_1^{F(L_E)} \frac{\rho}{A}d\left(\frac{1}{\rho A}\right) + \frac{32\mu G_M}{A_E D_{HE}^2}L_E + \int_1^2 \rho dP = 0 \qquad (1-3)$$

$$G^2 \int_1^2 \frac{\rho}{A}d\left(\frac{1}{\rho A}\right) + 32\mu G \int_1^2 \frac{1}{AD_H^2}dz + \int_1^2 \rho dP = 0 \qquad (1-4)$$

$$32\mu G \int_1^2 \frac{1}{AD_H^2}dz = \frac{32\mu G}{A_E D_{HE}^2}L_E + 32\mu G L_0 \int_1^{\zeta^*} \frac{1}{AD_H^2}d\zeta \qquad (1-5)$$

$$G^2 \int_1^{F(\zeta^*)} \frac{\rho}{A}d\left(\frac{1}{\rho A}\right) + \frac{32\mu G}{A_E D_{HE}^2}L_E + 32\mu G L_0 \int_1^{\zeta^*} \frac{1}{AD_H^2}d\zeta + \int_1^2 \rho dP = 0 \qquad (1-6)$$

$$G^2 \int_1^{F(\zeta^*)} \frac{\rho}{A}d\left(\frac{1}{\rho A}\right) + \frac{32\mu G}{A_E D_{HE}^2}L_E + 32\mu G L_0 \int_1^{\zeta^*} \frac{1}{AD_H^2}d\zeta$$

$$= G_M^2 \int_1^{F(L_E)} \frac{\rho}{A}d\left(\frac{1}{\rho A}\right) + \frac{32\mu G_M}{A_E D_{HE}^2}L_E \qquad (1-7)$$

$$G_M \cdot G^* \int_1^{F(\zeta^*)} \frac{\rho}{A}d\left(\frac{1}{\rho A}\right) + \frac{32\mu}{A_E D_{HE}^2}L_E + 32\mu L_0 \int_1^{\zeta^*} \frac{1}{AD_H^2}d\zeta$$

$$= \frac{G_M}{G^*} \int_1^{F(L_E)} \frac{\rho}{A}d\left(\frac{1}{\rho A}\right) + \frac{32\mu}{A_E D_{HE}^2}\frac{L_E}{G^*} \qquad (1-8)$$

Fig.8

$$32\mu L_0 \cdot \frac{1}{AD_H^2} + \frac{32\mu}{A_E D_{HE}^2} L_E \frac{1}{G^{*2}} \frac{dG^*}{d\zeta^*}$$

$$= G_M \int_1^{F(L_E)} \frac{\rho}{A} d\left(\frac{1}{\rho A}\right) \cdot \frac{d(1/G^*)}{d\zeta^*} - G_M d\left[G^* \int_1^{F(\zeta^*)} \frac{\rho}{A} d\left(\frac{1}{\rho A}\right)\right] / d\zeta^* \qquad (2-1)$$

$$32\mu L_0 \cdot \frac{1}{AD_H^2} - \frac{32\mu}{A_E D_{HE}^2} L_E \frac{1}{G^{*2}} \frac{dG^*}{dL^*}$$

$$= -G_M \int_1^{F(L_E)} \frac{\rho}{A} d\left(\frac{1}{\rho A}\right) \cdot \frac{d(1/G^*)}{dL^*} + G_M d\left[G^* \int_1^{F(L^*)} \frac{\rho}{A} d\left(\frac{1}{\rho A}\right)\right] / dL^* \qquad (2-2)$$

$$L_0 \cdot \frac{1}{AD_H^2} - \frac{1}{A_E D_{HE}^2} L_{EC} \frac{1}{G^{*2}} \frac{dG^*}{dL^*} = 0 \qquad (2-3)$$

$$L_{EC} = L_0 \cdot \frac{A_E D_{HE}^2}{AD_H^2} \cdot G^{*2} / \left(\frac{dG^*}{dL^*}\right) \qquad (2-4)$$

$$- \int_1^{F(L_E)} \frac{\rho}{A} d\left(\frac{1}{\rho A}\right) \cdot \frac{d(1/G^*)}{dL^*} + d\left[G^* \int_1^{F(L^*)} \frac{\rho}{A} d\left(\frac{1}{\rho A}\right)\right] / dL^* = 0 \qquad (2-5)$$

Fig.9

$$-\int_{1}^{F(L_E)} \frac{\rho}{A} d\left(\frac{1}{\rho A}\right) \cdot \frac{d(1/G^*)}{dL^*} + d\left[G^* \int_{1}^{F(L^*)} \frac{\rho}{A} d\left(\frac{1}{\rho A}\right)\right]/dL^* = 0 \quad (3-1)$$

$$-\int_{1}^{F(L_E)} \frac{\rho}{A} d\left(\frac{1}{\rho A}\right) \cdot \frac{d(1/G^*)}{dL^*} = -\int_{1}^{F(L_E)} \frac{1}{A} d\left(\frac{1}{A}\right) \cdot \frac{d(1/G^*)}{dL^*}$$

$$= -\frac{1}{2 A_E^2} \cdot \frac{d(1/G^*)}{dL^*} \quad (3-2)$$

$$d\left[G^* \int_{1}^{F(L^*)} \frac{\rho}{A} d\left(\frac{1}{\rho A}\right)\right]/dL^* = \frac{1}{2} \cdot \frac{d(G^*/A^2)}{dL^*} \quad (3-3)$$

$$\frac{d(G^*/A^2)}{dL^*} - \frac{1}{A_E^2} \cdot \frac{d(1/G^*)}{dL^*} = 0 \quad (3-4)$$

$$\frac{d[(G^*/A^{*2}) - (1/G^*)]}{dL^*} = 0 \quad (3-5)$$

$$\frac{G^*}{A^{*2}} - \frac{1}{G^*} = C \quad (3-6)$$

$$\frac{G^*}{A^{*2}} - \frac{1}{G^*} = 0 \quad (3-7)$$

$$G^* = A^* \quad (3-8)$$

$$\frac{A_E D_{HE}^2}{A D_H^2} = \left(\frac{A_E}{A}\right)^2 = \frac{1}{A^{*2}} \quad (3-9)$$

$$L_{EC} = L_0 \frac{G^{*2}}{A^{*2}} / \left(\frac{dG^*}{dL^*}\right) \quad (3-10)$$

$$L_{EC} = L_0 / \left(\frac{dG^*}{dL^*}\right) \quad (3-11)$$

Fig.11

| Linear type $G^* = 1/R_A$ $+ (1-1/R_A) \cdot L^*$ $\cdots (4-3)$ | Cross section form of flow path | General form | $L_{EC} = L_0 \{(A_E D_{HE}^2) / (A D_H^2)\}$ $\times \{1/R_A + (1-1/R_A) \cdot L^*\}^2$ $\times 1/(1-1/R_A) \cdots (4-5)$ [Quasicritical length] : at $L^*=1$ $L_{EC} = L_0 / (1-1/R_A)$ |
|---|---|---|---|
| | | Similar form | $L_{EC} = L_0$ $\times \{1/R_A + (1-1/R_A) \cdot L^*\}^2$ $\times 1/\{A^{*2} \cdot (1-1/R_A)\}$ $\cdots (4-6)$ [Quasicritical length] : at $L^*=1$ $L_{EC} = L_0 / (1-1/R_A)$ |
| | | Incompressible | [Critical length] $L_{EC} = L_0 / (1-1/R_A)$ $\cdots (4-7)$ |

Fig.16

| EQ type $G^* = (1/R_A)^{1-L^*}$ $\cdots(4-10)$ | Cross section form of flow path | General form | $L_{EC} = L_0 \{(A_E D_{HE}^2) / (A D_H^2)\}$ $\times (1/R_A)^{1-L^*} / \ln R_A$ $\cdots(4-12)$ [Quasicritical length] : at $L^*=1$ $L_{EC} = L_0 / \ln R_A$ |
|---|---|---|---|
| | | Similar form | $L_{EC} = L_0 (1/R_A)^{1-L^*}$ $\times 1 / (A^{*2} \ln R_A)$ $\cdots(4-13)$ [Quasicritical length] : at $L^*=1$ $L_{EC} = L_0 / \ln R_A$ |
| | | Incompressible | $L_{EC} = L_0 (1/R_A)^{1-L^*} / \ln R_A$ $\cdots(4-14)$ [Quasicritical length]: at $L^*=1$ $L_{EC} = L_0 / (1 - 1/R_A)$ |

Fig.20

$$dP = -\frac{1}{2}\lambda \frac{\rho u^2}{D_H} dz \qquad (5-1)$$

$$dP = -16\mu \frac{\left(1+\frac{\pi}{2}\right)^2}{\pi} \frac{G}{\rho A^2} dz \qquad (5-2)$$

$$\Delta P_{EQ} = -16\mu \frac{\left(1+\frac{\pi}{2}\right)^2}{\pi} \frac{G}{\rho} \int_0^{L_{EQ}} \frac{1}{A^2} dz \qquad (5-3)$$

$$A = A_{EQ} + \frac{A_E - A_{EQ}}{L_{EQ}} z \qquad (5-4)$$

$$dz = \frac{L_{EQ}}{A_E - A_{EQ}} dA \qquad (5-5)$$

$$\Delta P_{EQ} = -16\mu \frac{\left(1+\frac{\pi}{2}\right)^2}{\pi} \frac{G}{\rho} \int_0^{L_{EQ}} \frac{1}{A^2} \frac{L_{EQ}}{A_E - A_{EQ}} dA$$

$$= -16\mu \frac{\left(1+\frac{\pi}{2}\right)^2}{\pi} \frac{G}{\rho} \frac{L_{EQ}}{A_E \cdot A_{EQ}} \qquad (5-6)$$

$$\Delta P_E = -16\mu \frac{\left(1+\frac{\pi}{2}\right)^2}{\pi} \frac{G}{\rho} \frac{L_0}{A_E^2 \cdot (1-G_0^*)} \qquad (5-7)$$

$$L_{EQ} = \frac{A_{EQ}}{A_E} \frac{L_0}{(1-G_0^*)} \qquad (5-8)$$

MINUTE FLOW RATE CONTROLLER WITH ENTRANCE THROTTLE GROOVE

FIELD OF THE INVENTION

The present invention relates to a flow rate controller that controls flow of liquid or gas. More specifically, this relates to a method for designing a minute flow rate controller that controls minute flow of fluid (liquid or gas) in an extremely minute sized (such as microsized) flow path, environment for fluid movement, or reactor.

BACKGROUND ART

Recently, microminiaturization and integration of chemical reaction systems have been attracting attention as new technical subjects in synthetic chemistry, analytical chemistry, semiconductor industry, and biotechnology industry. It is thought that such microminiaturization and integration will play an important role in improving precision and promoting efficiency in the control of chemical reaction in systems for immunoassay, environmental analysis, cell biochemistry experiment, chemical gas-phase growth, and synthetic chemistry experiment. In such technological trend, new research and development is about to be promoted, whose subject is chemical reaction whose reaction capacity is a minuscule space from nanoliter to microliter, a so-called microreactor; and whose objective is improvement of reaction yield, shortening of reaction time, and decrease of burden to the environment. For the liquid or gas to be supplied to such a minute space, minute and precise flow control that is nonexistent in the existing technology is considered to be indispensable.

Conventionally, as the valve type used for minute flow adjustment of fluid, the needle valve type is usually used. As for the needle valve, since the flow rate increases suddenly after opening of the valve, it is difficult to employ it as a means to adjust the flow rate (for example, the maximum flow of 10 mL/min-1 mL/min for liquid, or a minute flow rate of 1-0.01 sccm for gas) supplied to said minute space. Therefore, the development of a new minute flow rate control technology suitable for such purpose has become necessary.

As for prior arts for minute flow rate control valves whose mechanism is different from the needle valve type, Japanese Patent Laid-Open No. 2001-187977 (patent document 1) and Japanese Patent Laid-Open No. 2003-278934 (patent document 2) have been made public. Both of these prior arts are characterized by the configuration in which the throttle groove that controls the fluid flow rate is arranged in an arc-shape.

[Patent Document 1] Japanese Patent Laid-Open No. 2001-187977
[Patent Document 2] Japanese Patent Laid-Open No. 2003-278934

DISCLOSURE OF THE INVENTION

Problems to be Solved by the Invention

FIG. 21 is an exploded perspective assembly view of the conventional flow control valve taught in the patent document 1. The main body of the valve, centralized on the central axis Z, is composed of the valve seat 110 and the valve member 103, and the metal valve 102 which forms the throttle groove 104 is located between the valve seat 110 and the valve member 103. The exit flow passage 114 is installed on the valve seat 110, and the groove portion 103a for the entrance flow passage is formed on the valve member 103. The fluid is led through the groove portion for the entrance flow passage 103a that is formed on the valve member 110, led through the throttle groove 104 that is formed on the metal valve 102, its flow rate controlled by the angle of rotation around the axis Z of the exit flow passage 114 located on the valve seat 110, and is led from the L-shaped exit flow passage 114 that is formed on the valve seat to the valve exit 114a. The rotation of this valve seat 110 is performed with a stepping motor placed at the upper part.

FIG. 22 is a plan view of the throttle groove 104 formed on the metal valve 102 in FIG. 21. The throttle groove 104 is formed around the Z-axis on the arc with radius r; its depth h remains constant, and its width W maximizes at the front end region, and is configured so that it gradually narrows toward the back end region. In the starting end position of the throttle groove 104, the through hole 113 that connects to the groove portion 103a for the entrance flow passage (FIG. 21) is formed. The flow rate of the fluid introduced through this hole 113 is controlled by the angle of rotation around the Z-axis of the L-shaped exit flow passage 114 formed on the valve seat 110.

Therefore, in order to adjust the fluid flow rate minutely, it becomes important that the valve seat 114 is rotated minutely. However, because the quantity of circumferential displacement by the rotation is proportional to the product of the circle radius and the rotation angle, the quantity of angle rotation becomes relatively small when the circle radius is large. Normally, not only with the needle valve but also with the flow rate control valve, in order to control minutely the extremely small circumferential displacement immediately after opening of the valve, it also becomes necessary to control minutely the angle of rotation. However, when the circle radius is large, the adjustment of the rotation angle must be performed even more minutely, which means that the minute flow rate control becomes even more difficult. On the other hand, when the circle radius is small, it conversely becomes difficult to engrave such arc-shaped throttle groove precisely. Therefore, in the arc-shaped throttle groove, the circle radius becomes necessarily large, and a difficulty in minute angle control arises.

The length from the starting end position 104a of the throttle groove 104 to the finishing end position 104b is defined as $L_0$; and the length of the throttle groove 104 from the aperture cross section 114b which is formed on the exit flow passage 114a, to the finishing end 104b of the throttle groove, is defined as L. The ratio between the length L of the aperture and its maximum length $L_0$ is defined as L*. L* varies within the limits of 0-1. When the valve moves straightly, it signifies the dimensionless length of the lift (also called relative travel). Henceforth, L* is termed dimensionless lift.

The present inventor has analyzed the relation between the extent of valve opening of a minute flow rate controller and the flow rate, or that is to say, the requirement in changing the cross section area of the throttle groove along the flow passage in order to make the flow rate characteristic equal to a desired characteristic, and have investigated the characteristics observed in the change in the axial direction of the cross section area of the throttle groove with the change in various design parameters such as the physical characteristics of the fluid, the differential pressure between the front and the back of the valve, the height and the aspect ratio (the ratio between the height and the width) whenever the configuration of the cross section is rectangular, and the length of the groove. By the way, the flow rate characteristic of the flow rate adjustment valve is called the valve characteristic; among this, there are the linear characteristic and the equal percentage characteristic, and usually it is designed so that either characteristic is imparted. The basic attribute found in the flow rate characteristic of minute flow rate controller will be described for the case in which the valve characteristic of the linear type is imparted. In FIG. 23, water of 20 degrees Celsius is used as the reference for the physical property values of the fluid; and it indicates the requirement in changing the cross section area of the throttle groove in the flow direction, in order to equalize the valve characteristic of the required linear type, when the viscosity coefficient becomes 10 times to 20 times that of this water.

FIG. 23 is the correlation diagram for a minute flow rate controller of the conventional type, in which the dimensionless length $L^*$ referenced to the length of the throttle groove (corresponding to the dimensionless lift when the length of the groove is taken with the purpose of making $L^*=1$ when the valve is fully opened) is made to be the abcissa, and the ratio between the cross section area at a given position and the entrance cross section area of the groove (the dimensionless cross section area $A^*$) and the dimensionless flow rate $Q^*$ (volumetric flow rate ratio) based on the flow rate at the time of full opening of the valve are made to be the ordinates. The configuration of the throttle groove cross section is rectangular, its length $L_0$ is 10 mm and its height $H_0$ uniformly 0.5 mm, and the aspect ratio Ca of the groove is 1.5 at the entrance of the throttle groove. In addition, the differential pressure between the entrance and the exit of the valve is set to be 0.001 MPa (flow rate of about 12 mL/min at the full opening position). Usually, for either the linear characteristic or the equal percentage characteristic, when the value of $G^*$ (mass flow rate ratio: same as $Q^*$ in the case of liquid) generated immediately after valve opening is set to $G^*_0$, its reciprocal $1/G^*_0$ corresponds to the quantity of the ability of said valve for controlling the flow rate, expressed in a multiple of the flow rate immediately after the valve opening; this is termed rangeability (henceforth denoted as $R_A$). FIG. 23 shows the case in which $R_A=20$. The cross section area of the throttle groove does not vary monotonically with respect to the dimensionless lift. As shown in FIG. 23, it may take the form of a curve taking its maximum between $L^*=0-1$, and with an increase of viscosity, it becomes a curve having a steeper peak. As a general trend, the maximum of the dimensionless cross section area $A^*$ increases along with the decrease in the depth of the groove and the increase of the aspect ratio at the entrance of the groove. These signify that the maximum of $A^*$ increases as the flow rate decreases. Therefore, in the case of an extremely minute flow rate of 10 mL/min or less, which is considered to be a problem in a microreactor, there is a tendency for the curve to take a prominent peak, even for a fluid of relatively low viscosity. Such tendency not only makes the processing of the groove difficult, but also makes probable that a separation of the flow accompanying an immediate expansion of the flow passage cross section area is caused, and the flow characteristic is made unstable. In addition, upon a change in the condition of usage, a change is caused in the flow rate in which the valve characteristic deviates from the linear characteristic type. The tendencies described above may become apparent and turn into problems even for the case in which the valve characteristic is of the equal percentage characteristic.

On the other hand, the electrically operated flow rate control valve described in Japanese Patent Laid-Open No. 2003-278934 (patent document 2) is configured from an upper valve and a lower valve, and the hermeticity of the valve is increased by applying fluid pressure to the lower valve by opening and closing of the upper valve. However, because it is mechanically similar to the electrically operated flow rate control valve described in the patent document 1, a separation of the fluid flow is caused, accompanying an immediate expansion of the flow passage cross section area, and the previously mentioned problems such as the destabilization of the flow characteristic are present. The present inventor studied intensively to solve this problem, and as the result, came up with the idea of imparting flow resistance upstream of the throttle groove; and based on the hydrodynamic theory, derived the method of designing the structure of a throttle groove that causes this flow resistance, and thus completed the present invention.

The objective of the present invention is to realize a desired valve characteristic without giving rise to a flow instability upon forming a suddenly expanded portion of the flow as seen in FIG. 23, in order to control stably and accurately the minute flow rate of the fluid. In other words, it is to provide a design method of a minute flow rate controller that can realize a desired valve characteristic, under the condition in which the cross section area of main throttle groove is varied monotonically along the flow direction, by placing an entrance throttle groove that impart a flow resistance of appropriate quantity at the entrance side of the main throttle groove.

Means to Solve the Problem

The present invention was achieved in order to solve the problem. The first form of the present invention is a method of designing a minute flow rate controller equipped with an entrance throttle groove, said minute flow rate controller comprising an inflow passage for introducing a fluid, a valve member on which a main throttle groove is formed, for flowing the fluid introduced from said inflow passage from a starting end to a finishing end, a flow rate regulating component that hermetically seals said main throttle groove up to a desired position, a fluid outflow port that opens by said flow rate regulating component at a given cross section of said main throttle groove, and an outflow passage that lead out the fluid that flows out of said fluid outflow port, wherein an entrance throttle groove that precedes connectively is established at the starting end cross section of said main throttle groove, and the dimension of the entrance throttle groove is determined so as to exhibit a desired flow resistance, based on a relational equation derived from a momentum equation of the fluid that flows through said entrance throttle groove and main throttle groove.

The second form of the present invention is the method for designing a minute flow rate controller equipped with an entrance throttle groove according to said first form, wherein the dimension of said entrance throttle groove is determined so that when the cross section area of said main throttle groove monotonically decreases from the starting end to the finishing end, the flow rate of the fluid that flows out from said fluid outflow port monotonically decreases, as the position of said fluid outflow port moves from the starting end to the finishing end.

The third form of the present invention is the method for designing a minute flow rate controller equipped with an entrance throttle groove according to either of said first or second form, wherein the momentum equation of said fluid is expressed as $u\rho(du/dz)+(\lambda/D_H)(1/2)u^2\rho+dP/dz=0$ (here, u is the flow velocity, $\rho$ is the density, z is the flow direction coordinate of fluid, $\lambda$ is the friction coefficient, $D_H$ is the equivalent diameter of throttle groove cross section area, and P is the pressure)

The fourth form of the present invention is the method for designing a minute flow rate controller equipped with an entrance throttle groove according to said third form, wherein said momentum equation is computed based upon $u=G/(\rho A)$ and $\lambda=64\ \mu A/(GD_H)$ (here, G is the mass flow rate, $\rho$ is the fluid density, A is the cross section area of the fluid outflow port, and $\mu$ is the viscosity coefficient of the fluid).

The fifth form of the present invention is the method for designing a minute flow rate controller equipped with an entrance throttle groove according to said fourth form, wherein the critical length of the entrance throttle groove $L_{EC}$ is given as $L_{EC}=L_0/(dG^*/dL^*)_{L^*=1}$, whenever the finishing end position of said main throttle groove is set at L=0, the position of the fluid outflow port is set at L=L, the starting end position is set at $L=L_0$, the flow rate when the fluid outflow port is located at $L=L_0$ is set at $G_M$, the flow rate when the fluid output port is located at L=L is set at G, and the value of $(dG^*/dL^*)$ at $L^*=L/L_0$, $G^*=G/G_M$, and the value of $(dG^*/dL^*)$ at $L^*=1$ is set to $(dG^*/dL^*)_{L^*=1}$.

The sixth form of the present invention is the method for designing a minute flow rate controller equipped with an entrance throttle groove according to said fifth form, wherein the critical length $L_{EC}$ corresponding to the linear type, in which the valve characteristic may be expressed as $G^*=L^*$, is given as $L_{EC}=L_0$, whenever said fluid is an incompressible fluid, and the forms of given cross sections of the main throttle groove are similar figures.

The seventh form of the present invention is the method for designing a minute flow rate controller equipped with an entrance throttle groove according to said fourth form, wherein said critical length $L_{EC}$ is given by $L_{EC}=L_0/(dG^*/dL^*)$, whenever the finishing end position of said main throttle groove is at L=0, the position of the fluid outflow port is at L=L, the starting end position is at $L=L_0$, the flow rate when the fluid outflow port is at $L=L_0$ is $G_M$, the flow rate when the fluid outflow is at L=L is G, the forms of given cross sections of said main throttle groove are non-similar figures, and the valve characteristic is of the linear type.

The eighth form of the present invention is the method for designing a minute flow rate controller equipped with an entrance throttle groove according to said fifth or seventh form, wherein said critical length $L_{EC}$ is given by $L_{EC}=L_0/(1-1/R_A)$, whenever the valve characteristic is of the linear type, and may be expressed as $G^*=G_0^*+(1-G_0^*)L^*$ (here, $G_0^*$ is the value of $G^*$ at $L^*=0$), and may be expressed as $G_0^*=1/R_A (1 \leq R_A \leq \infty)$.

The ninth form of the present invention is the method for designing a minute flow rate controller equipped with an entrance throttle groove according to said fifth or seventh form, wherein said critical length $L_{EC}$ is given as $L_{EC}=L_0/\ln(R_A)$, whenever the valve characteristic is of the equal percentage type that may be expressed as $G^*=G_0^{*(1-L^*)}$ (here, $G_0^*$ is the value of $G^*$ when $L^*=0$), and where $G_0^*=1/R_A$ $(1 \leq R_A \leq \infty)$.

The tenth form of the present invention is the method for designing a minute flow rate controller equipped with an entrance throttle groove according to any of said first to fourth forms, wherein it is equipped with an entrance throttle groove in which the cross section area of said entrance throttle groove increases monotonically toward the starting end position of said main throttle groove.

The eleventh form of the present invention is the method for designing a minute flow rate controller equipped with an entrance throttle groove according to said tenth form, wherein the cross section area $A_E(z)$ of said entrance throttle groove increases linearly along the flow direction coordinate z, and said cross section area $A_E(z)$ is given as $A_E(z)=A_{EQ}+\{(A_{E0}-A_{EQ})/L_{EQ}\} \cdot z$ (here, $A_{EQ}$ is the starting end cross section area of the entrance throttle groove, $A_{E0}$ is the finishing end cross section area of the entrance throttle groove nearest to the starting end position of said main throttle groove, $L_{EQ}$ is the length of the entrance throttle groove, and z is the flow direction coordinate of the fluid).

The twelfth form of the present invention is the method for designing a minute flow rate controller equipped with an entrance throttle groove according to said eleventh form, wherein the finishing end position of said main throttle groove is L=0, the starting end position is $L=L_0$, the flow rate when the fluid overflow port is at L=0 is $G_0$, the flow rate when the fluid overflow port is at $L=L_0$ is $G_M$, $G_0^*=G_0/G_M$, $R_A=1/G_0^*$, and the subsequent length $L_{EQ}=(A_{EQ}/A_{E0})\{L_0/(1-G_0^*)\}=(A_{EQ}/A_{E0})\{L_0/(1-1/R_A)\}$ of the entrance throttle groove, obtained by assuming that the frictional pressure drop inside said entrance throttle groove takes an equivalent quantity to the frictional pressure drop exhibited by an entrance throttle groove with a constant cross section area whose critical length $L_{EC}$, is taken.

Effect of the Invention

According to the first form of the present invention, because the dimension of the entrance groove, which is connectedly formed preceding the starting end position of the main throttle groove in the minute flow rate controller, is determined according to the relational equation derived from the momentum equation of the fluid that flows through the throttle groove, by forming the entrance throttle groove designed by the design method of the present invention, the dimension of the main throttle groove that has a simple structure, and realizes the desired valve characteristic, can be determined. In other words, because the dimension of the entrance throttle groove that exhibits a flow resistance matching the desired valve characteristic is determined based on said relational equation, there is no need to vary the cross section area of the main throttle groove precipitously or delicately in order to realize the desired valve characteristic; and the dimension of the cross section area, varying monotonically along the axis, of the main throttle groove can be determined. In addition, the relational equation for determining the dimension of the entrance throttle groove can be derived from the momentum equation, under the condition that the desired valve characteristic is imparted. In addition, by forming the entrance throttle groove designed by the design method of the present invention, a highly accurate control of the minute flow rate can be easily performed through the minute flow rate controller equipped with the main throttle groove with a simple structure. Furthermore, by said main throttle groove having a simple structure, a highly precise minute flow rate controller can be produced easily, and the production cost of the minute flow rate controller can be reduced.

According to the second form of the present invention, the flow rate can be adjusted with high accuracy through the minute flow rate controller on which the main throttle groove whose cross section area decreasing monotonically from the starting end to the finishing end. As described previously, in the conventional minute flow rate controller, it was necessary to narrow the vicinity of the starting end of the main throttle groove in order to realize a monotonical decrease by moving the flow rate regulating component. However, by forming connectively the entrance throttle groove of the present invention, it is possible to realize the desired flow rate characteristic through the main throttle groove whose cross section area varies monotonically. Said main throttle groove, whose cross section area decreases monotonically, is easily formed on said valve member, and can process the form of the designed main throttle groove with high precision. Therefore, a highly precise minute flow rate controller can be offered, and at the same time, the yield in production can be improved markedly.

According to the third form of the present invention, by applying $$u\rho(du/dz)+(\lambda/D_H)(1/2)u^2\rho+dP/dz=0 \quad (1)$$

(here, u is the flow velocity, $\rho$ is the density, z is the flow direction coordinate, $\lambda$ is the friction coefficient, $D_H$ is the equivalent diameter of the throttle groove cross section area, and P is the pressure) as said fluid momentum equation, said relational equation can be derived. Here, for a throttle groove having an arbitrary cross-section form, the equivalent diameter $D_H$ defined as $D_H=4$ A/U is used.

According to the fourth form of the present invention, because the flow velocity u is expressed as $$u=G/(\rho A) \quad (2)$$

the relational equation may include the cross section area A of the throttle groove and the mass flow rate G as variables or parameters, and the relation between the desired valve characteristic and the dimension of the entrance throttle groove can be formulated clearly. Furthermore, by assuming the flow in the throttle groove to be a laminar flow, said friction coefficient $\lambda$ depends upon only the Reynolds number Re of the fluid, where $$\lambda=64/Re \quad (3).$$

Here, the Reynolds number is defined in the next equation.

$$Re=D_H u/(\mu/\rho) \quad (4)$$

Therefore, because it follows that $$\lambda=64 \ \mu A/(GD_H) \quad (5)$$

said friction coefficient $\lambda$ may easily be derived.

According to the fifth form of the present invention, when the finishing end position of said main throttle groove is at L=0, the position of the fluid outflow port is at L=L, the starting end position is at L=$L_0$, the cross section area of the main throttle groove when L=L is A, the flow rate when the fluid outflow port is at L=$L_0$ is $G_M$, the flow rate when the fluid outflow port is at L=L is G, L*=L/$L_0$, G*=G/$G_M$, and the value of (dG*/dL*) at L*=1 is $(dG^*/dL^*)_{L^*=1}$, the critical length $L_{EC}$ of the entrance throttle groove is given by $$L_{EC}=L_0/(dG^*/dL^*)_{L^*=1} \quad (6),$$

and one may determine the dimensionless cross section area A* (=A/$A_E$) of the main throttle groove by solving for said momentum equation under the desired valve characteristic. A* derived thus becomes G*=A* at the vicinity of L*=1. Furthermore, A* has a characteristic that it varies monotonically in the axial direction. Such design technique can be applied whether or not the fluid is compressible, whether or not the cross section forms of the throttle groove are similar in the axial direction, or whether or not the valve characteristic is of the linear type or the equal percentage type.

According to the sixth form of the present invention, when said fluid is an incompressible fluid, and the forms of arbitrary cross sections of the main throttle groove are similar to one another, the critical length $L_{EC}$ for the linear type whose valve characteristic is expressed as G*=L* is given as $$L_{EC}=L_0 \quad (7)$$

and by setting A*=L*, valve characteristic such that it becomes G*=L* can be realized. When the momentum equation is applied to an entrance throttle groove whose critical length $L_{EC}$ is set by $L_{EC}=L_0$, and connecting with this, a flow passage consisting of a main throttle groove, G*=A*=L* is derived as the relation between the valve characteristic and the dimensionless cross section area A* of the main throttle groove. Therefore, if the entrance throttle groove is set to $L_{EC}=L_0$, one can impart a simple valve characteristic onto the minute flow rate controller, in which the flow rate G becomes a simple multiple of the position L of the fluid outflow port, and control the minute flow rate can be performed easily and with high accuracy, by choosing the dimension the cross section of the main throttle groove for the purpose of achieving A*=L*.

According to the seventh form of the present invention, whenever the finishing end position of said main throttle groove is at L=0, the position of the fluid outflow port is at L=L, the starting end position is at L=$L_0$, the flow rate when the fluid outflow port is at L=$L_0$ is $G_M$, the flow rate when the fluid outflow port at L=L is G, the forms of arbitrary cross sections of said main throttle groove are non-similar, L*=L/$L_0$, G*=G/$G_M$, and the valve characteristic is of the linear type, said critical length $L_{EC}$ is given by $$L_{EC}=L_0/(dG^*/dL^*) \quad (8)$$

and by solving for the said momentum equation for the desired valve characteristic, the dimensionless cross section area A* of the main throttle groove that varies monotonically along the axial direction may be determined.

According to the eighth form of the present invention, whenever the valve characteristic is of the linear form that is expressed as $$G^*=G_0^*+(1-G_0^*)L^* \quad (9)$$

said critical length $L_{EC}$ is expressed as $$L_{EC}=L_0/(1-1/R_A) \quad (10)$$

and therefore, when said length $L_0$ of the main throttle groove and the rangeability $R_A$ are given, the critical length of the entrance throttle groove that imparts the valve characteristic of said linear type is easily determined. The dimensionless flow rate $G^*_0$ corresponds to the magnitude when the flow rate regulating ability of the valve is expressed as a multiple of the flow rate immediately after the valve opening; the rangeability $R_A$ is defined as the inverse $1/G^*_0$ of $G^*_0$, and it is the quantity that characterizes the valve characteristic in the vicinity of the full closing state (L*=0).

According to the ninth form of the present invention, whenever the valve characteristic is of the equal percentage type that is expressed by $$G^*=G_0^{*(1-L^*)} \quad (11)$$

and $G_0^*$ is the value of G* at L*=0, and is expressed as $G_0^*=1/R_A(1 \leq R_A \leq \infty)$, because said critical length $L_{EC}$ is given by $$L_{EC}=L_0/\ln(R_A) \quad (12)$$

the length of the entrance throttle groove that realizes the valve characteristic of the equal percentage type may be determined.

According to the tenth form of the present invention, whenever the cross section area of the finishing end position of said entrance throttle groove is equal, because the flow resistance due to the entrance throttle groove may be increased by monotonically increasing the cross section area of the entrance groove toward the starting position of said main throttle groove, or in other words, by decreasing monotonically toward the entrance of the entrance throttle groove, the length of said entrance throttle groove can be shortened. Therefore, the minute flow rate controller can be made compact.

According to the eleventh form of the present invention, because the cross section area of said entrance throttle groove increases linearly along the flow direction coordinate z, and said cross section area is given by $$A_E(z) = A_{EQ} + \{(A_{E0} - A_{EQ})/L_{EQ}\} \cdot z \quad (13)$$

the pressure loss of the fluid at this entrance throttle groove may be easily estimated, at the same time as the flow resistancy due to said entrance throttle groove increases. In other words, the dimension of the entrance throttle groove that gives the desired valve characteristic can be easily determined.

According to the twelfth form of the present invention, because the length of said entrance throttle groove is given by $$\begin{aligned} L_{EQ} &= (A_{EQ}/A_{E0})(L_0/(1-G_0^*)) \\ &= (A_{EQ}/A_{E0})(L_0/1 - 1/R_A^*)) \end{aligned} \quad (14)$$

the length of the entrance throttle groove which imparts the valve characteristic of the linear type to the minute flow rate controller can be determined easily.

BRIEF DESCRIPTION OF DRAWINGS

FIG. 7 is a process chart for the calculation of the momentum equation of the present invention.

FIG. 8 is a process chart for the derivation of the relational equation of the present invention.

FIG. 9 is a process chart for the derivation of the relational equation for an incompressible fluid.

FIG. 11 is a classification figure of the critical length in the case where the valve characteristic is of the linear type.

FIG. 16 is a classification figure of the critical length when the valve characteristic is of the equal percentage (EQ) type.

FIG. 20 is a process chart for deriving the length of the shortened entrance throttle groove of the present invention.

Figure 1:
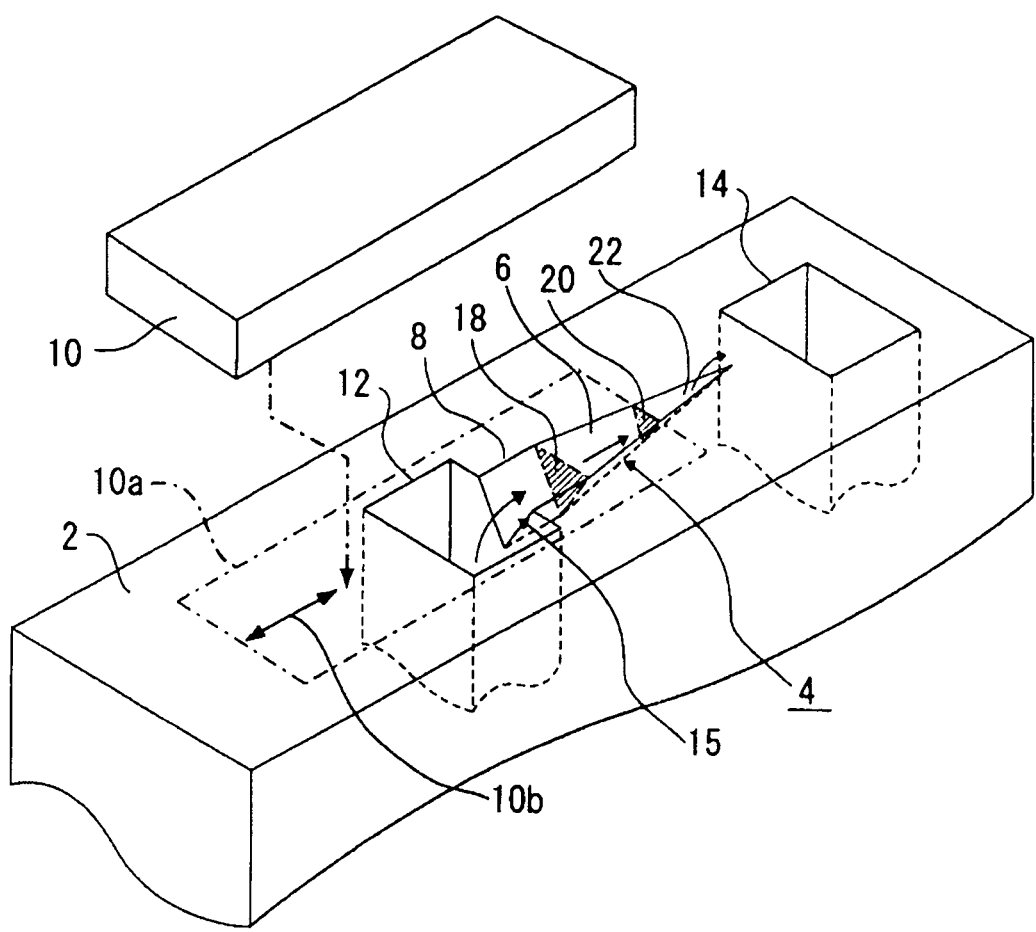
FIG. 1 is a schematic illustration of the minute flow rate controller of the present invention.

| DENOTATION OF REFERENCE NUMERALS | |
|---|---|
| 2 | Valve member |
| 4 | Throttle groove |
| 6 | Main throttle groove |
| 8 | Entrance throttle groove |
| 10 | Flow rate regulating slider |
| 10a | Sliding position |
| 10b | Arrow |
| 12 | Inflow passage |
| 14 | Outflow passage |
| 15 | Inflow portion |
| 16 | Starting end cross section of entrance throttle groove |
| 18 | Starting end cross section of main throttle groove |
| 19 | Finishing end cross section of entrance throttle groove |
| 20 | Fluid outflow port |
| 22 | Outflow portion |
| 24 | Sliding range |
| 24a | Full opening position |
| 24b | Full closing position |
| 26 | Tube passage |
| 26a | Minute column |
| 102 | Metal valve |
| 103 | Valve member |
| 103a | Groove portion for entrance flow passage |
| 104 | Throttle groove |
| 110 | Valve seat |
| 113 | Through hole |
| 114 | Exit flow passage |
| 114a | Valve exit |

BEST MODE FOR CARRYING OUT THE INVENTION

FIG. 1 is a schematic illustration of the minute flow rate controller of the present invention. The basic structure of the minute flow rate controller consists of the valve member 2 on which throttle groove 4 is formed, and the flow rate regulating slider 10. The throttle groove 4 is composed of the main throttle groove 6 and the entrance throttle groove 8, and the main throttle groove 6 and the entrance throttle groove 8 functions as the flow passages, by said flow rate regulating slider 10 sliding at the upper surface of the valve member. When said flow rate regulating slider 10 is at the sliding position 10a on the top surface of the valve member 2, the fluid which flows from the inflow passage 12 flows into the entrance throttle groove 8 through the inflow portion 15, flows out from the fluid outflow port 20 through said main throttle groove 6, and flows into the outflow passage 14 through the outflow portion 22. The length of said main throttle groove 6 is varied, and the fluid flow rate is adjusted, by said flow rate regulating slider 10 sliding in the direction of the arrow 10*b*.

Figure 2:
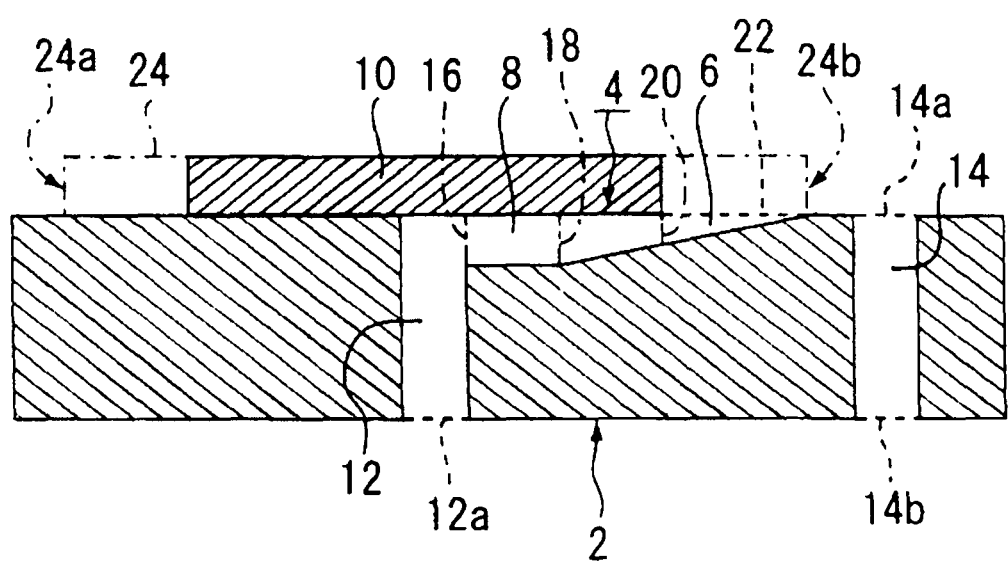
FIG. 2 is a schematic cross-sectional view of the minute flow rate controller of the present invention.

FIG. 2 is a schematic cross-sectional view of the minute flow rate controller of the present invention. The flow rate regulating slider 10 slides on the top surface of the valve member 2, and can be moved freely within the sliding range 24 from the full opening position 24*a* to the full closing position 24*b*. It is not shown in this figure, but on the slight-movement flow rate controller, an actuating means for moving the position of the flow rate regulating slider 10 depending on the desired flow rate is provided, and a slight-movement controlling means consisting of a stepping motor or a piezo-electric device can be used as this actuating means.

Figure 3:
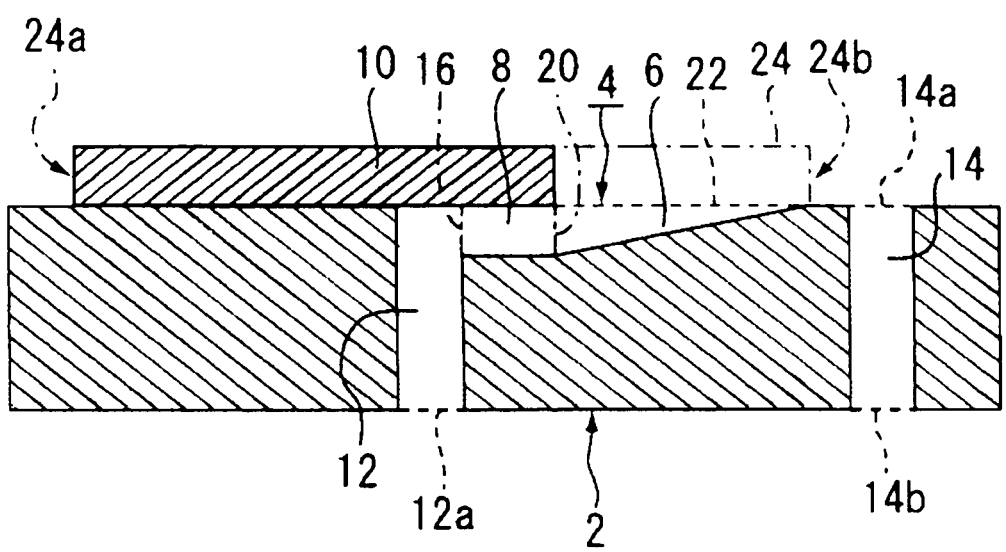
FIG. 3 is a schematic cross-sectional view in which the minute flow rate controller of the present invention is in the full opening state.

FIG. 3 is a schematic cross-sectional view in which the minute flow rate controller of the present invention is in the full opening state. When an end of the flow rate regulating slider 10 is at the full opening position 24*a* within said sliding range 24, the cross section area 20 of the fluid outflow port 20 maximizes, and the maximum flow rate is supplied from the outflow portion 22 to the outflow passage 14.

Figure 4:
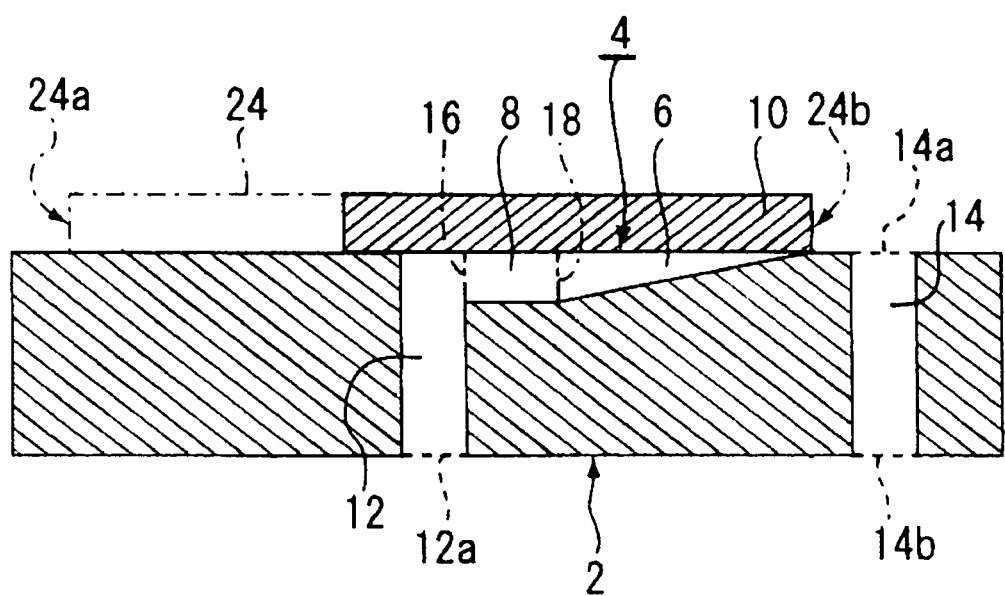
FIG. 4 is a schematic cross-sectional view in which the minute flow rate controller of the present invention is in the full closing state.

FIG. 4 is a schematic cross-sectional view in which the minute flow rate controller of the present invention is in the full closing state. When the end surface of the flow rate regulating slider 10 is at the full closing position 24*b* within the sliding range 24, the outflow portion becomes completely closed by said flow rate regulating slider, and the flow rate becomes 0.

Figure 5:
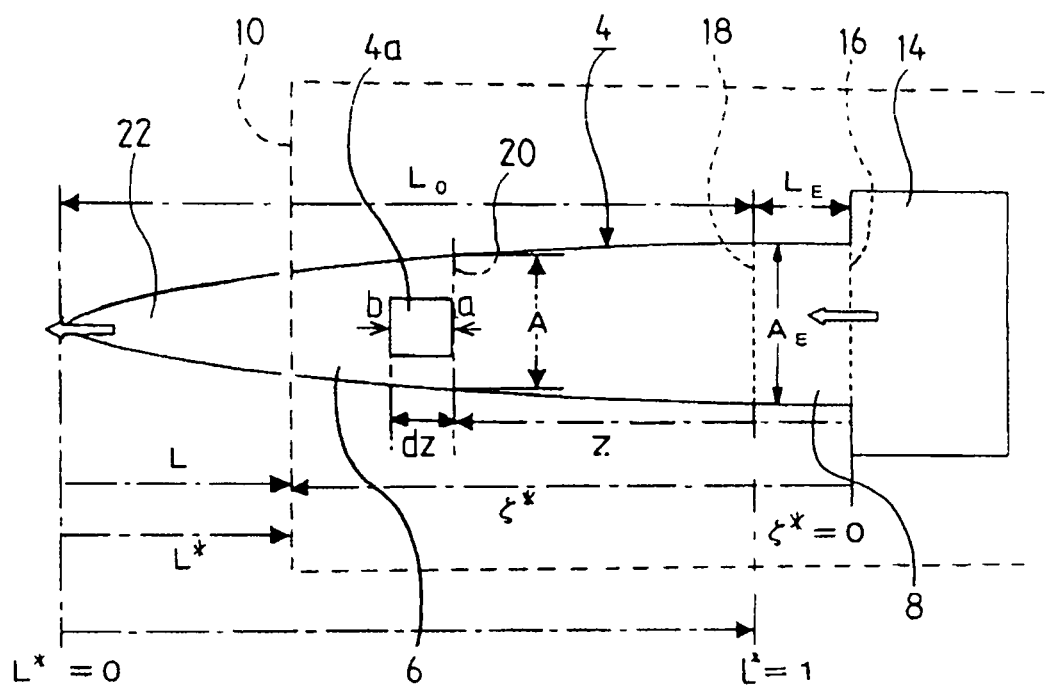
FIG. 5 is a schematic plan view of the minute flow rate controller.

FIG. 5 is a schematic plan view of the minute flow rate controller. Said momentum equation (1)

$$u\rho(du/dz)+(\lambda/D_H)(1/2)u^2\rho+dP/dz=0 \quad (1)$$

(here, u is the flow velocity, $\rho$ is the density, z is the flow direction coordinate, $\lambda$ is the friction coefficient, $D_H$ is the equivalent diameter of the throttle groove, and P is the pressure) is applied to the throttle groove 4 of the present invention. u is defined as the mean flow velocity in the throttle groove cross section, $\rho$ as the density, and z-axis as the fluid flow direction (it is referred to as the flow direction coordinate z). Furthermore, the length of the main throttle groove is given as $L_0$, the length of the entrance throttle groove is given as $L_E$, and the position coordinate L of the flow rate regulating slider 10 (it is referred to as "lift") is $L=L_0$ at the finishing end position of said main throttle groove, and $L=0$ at the starting end position. In addition, the flow rate regulating slider 10 position is given by the dimensionless coordinate $\zeta^*=1-L^*$ that is standardized by $L_0$, with the dimensionless lift $L^*=L/L_0$ in which L is standardized by $L_0$, and the starting end position of the main throttle groove as the origin.

Figure 6:
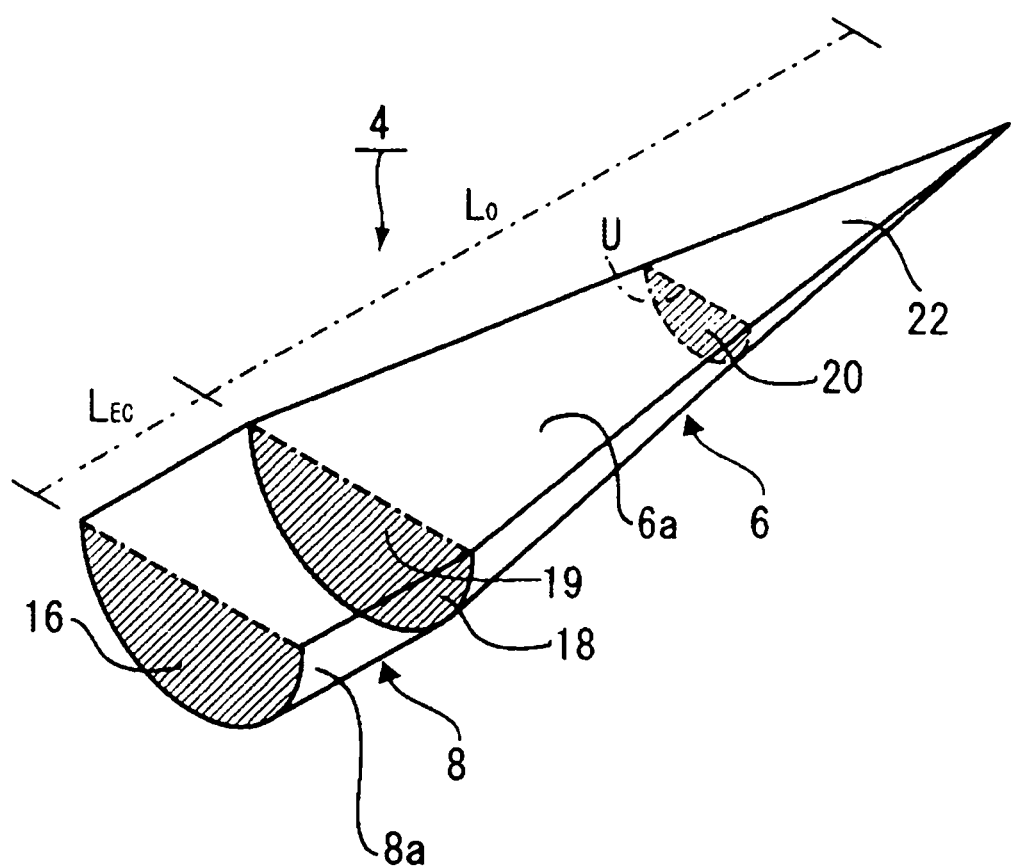
FIG. 6 is a schematic diagram of the throttle groove of the present invention.

FIG. 6 is a schematic diagram of the throttle groove 4 of the present invention. The momentum equation (1) of the fluid in the tube passage shown in FIG. 6 is applied to the fluid in the throttle groove of the present invention. As described above, the equivalent diameter in the equation is defined by $D_H=4A/U$, by using the cross section area A of the flow passage, and its circumference U. It is the representative length that indicates the equivalence of the flow passage in question to a cylindrical pipe whose diameter is to be calculated. For example, when the cross-section form is a semicircle of diameter D, through $A=(1/2)\pi(D/2)^2$ and $U=D+\pi(D/2)$, the equivalent diameter $D_H$ becomes $$D_H=\{(2\pi)^{0.5}/(1+\pi/2)\}\cdot A^{0.5} \quad (15).$$

Even for a cross section form aside from semicircular, if it is a cross-section form that is similar and does not comprise a complicated surface that entwine inward, because there exists a relation that circumference U is proportional to $A^{0.5}$, it is established that $D_H \propto A^{0.5}$ which is found in the equation (15).

Subsequently, from the momentum equation (1), the basic relational equation between the desired valve characteristic and the critical length of the entrance throttle groove is derived. FIG. 7 is a process chart for the calculation of the momentum equation of the present invention. Said momentum equation (1) is duplicated as the equation (1-1). The flow velocity u is related with the mass flow rate G by the following equation from the continuity condition of fluids.

$$u=G/(\rho A) \quad (2)$$

The friction coefficient $\lambda$ for a laminar flow is expressed by the following equation.

$$\lambda=64\,\mu A/(GD_H) \quad (5)$$

When the equations (2) and (5) are substituted into said momentum equation (1-1) and rearranged, the equation (1-2) is obtained.

Next, said momentum equation (1-2) is applied to the flow inside the entrance throttle groove at the time in which the valve is fully opened. By multiplying both sides by $\rho$, assuming that the maximum flow rate is $G_M$, and the cross section area of the entrance throttle groove $A_E$ is constant, the equation (1-3) is obtained when said momentum equation (1-2) is integrated along the entire length of the entrance throttle groove. 1 and 2 denoted on the integral symbol of the equation (1-3) indicate the states of the inflow portion and the outflow portion. In addition, the upper integration limit $F(L_E)$ of the first term indicates the value of the parameter $\{1/(\rho A)\}$ at the exit surface of the entrance throttle groove.

Next, when said lift L takes an arbitrary value (L=L), the equation (1-4) is obtained when the equation (1-2) is multiplied with $\rho$ and integrated from the inflow portion to the outflow portion, assuming that the flow rate that corresponds to lift L from the given valve characteristic is G. The integration of the second term of the left hand side of this equation (1-4) is done throughout the entire entrance throttle groove, and from the entrance of the main throttle groove up to the lift L. In other words, the extent of z is from 0 to $\{L_E+(L_0-L)\}$, and may be divided into the entrance domain from 0 to $L_E$, and the main domain from $L_E$ to $(L_0-L)$. In order to perform the integration on this main domain, the dimensionless coordinate $\zeta$ and said dimensionless coordinate $\zeta^*$ $(=1-L^*)$, with the origin at the starting end position of the main throttle groove, are used. The dimensionless coordinate $\zeta$ is defined by $$\zeta=(z-L_E)/L_0 \quad (16)$$

and when dz is variable-transformed to $d\zeta$, $$dz=L_0 d\zeta \quad (17)$$

is obtained.

The second term of the equation (1-4) may be divided into two parts, said main domain (variable $\zeta$: 0-1) and entrance domain (variable z: 0-$L_E$), and the equation (1-5) is obtained. When this equation (1-5) is substituted into the equation (1-4), the equation (1-6) is obtained. In addition, because A in the first term of the left hand side of the equation (1-4) is a function of $\zeta$, the upper limit value of the integral can be written as $F(\zeta^*)$. In other words, it signifies that concerning the parameter $\{1/(\rho A)\}$, the integral is performed from the inflow portion 1 to $\zeta^*$. Because the third term of the equation (1-3) and the fourth term of the equation (1-6) are equal, the equation (1-7) is obtained when these are substituted. When this equation (1-7) is divided by G, then substituted with $G^*=G/G_M$, it becomes the equation (1-8).

FIG. 8 is a process chart for the derivation of the relational equation of the present invention. When the equation (1-8) is differentiated with respect to $\zeta^*$, it becomes the equation (2-1). Because the dimensionless coordinate $\zeta^*$ is $(=1-L^*)$, when $\zeta^*$ is rewritten by $L^*$, the equation (2-3) is obtained. $L_E$ satisfying the condition equation (2-3) in which the left hand side of this equation (2-2) becomes 0 is defined as the critical length $L_{EC}$. This critical length $L_{EC}$ has an implication that it is the optimum length of the entrance throttle groove that is suitable for the realization of the desired valve characteristic. In other words, said condition equation (2-3) is used as the relational equation for deriving the critical length $L_{EC}$, which is the optimum length of the entrance throttle groove, from the desired valve characteristic and the form of the main throttle groove. Therefore, from said equation (2-3), said critical length $L_{EC}$ is expressed by relational equation (2-4). Because the physical property value is not included in this relational equation (2-4), it does not limit whether the fluid is liquid or gas. Said relational equation (2-4) is applied to various fluids. Furthermore, when the left hand side of the equation (2-2) is 0, the right hand side is also 0, and therefore the equation (2-5) is obtained.

FIG. 9 is a process chart for the derivation of the relational equation for an incompressible fluid. The equation (3-1) shows the equation (2-5) shown in FIG. 8. When the fluid is a liquid that is incompressible, the integral in the first term of the equation (3-1) becomes the equation (3-2), assuming that the cross section area of the inflow portion (1) is sufficiently larger compared to the cross section area of the throttle groove. On the other hand, the second term of the equation (3-1) can be rewritten as the equation (3-3). By substituting the equation (3-2) and the equation (3-3) into the equation (3-1), the equation (3-4) is obtained. Here, when it is rewritten using the dimensionless cross section area $A^*=A/A_E$, it is expressed as the equation (3-5). Therefore, because the differential value of $[(G^*/A^2)-(1/G^*)]$ with respect to $L^*$ is 0, as it is indicated in the equation (3-6), the equation (3-5) indicates that $[(G^*/A^{*2})-(1/G^*)]$ is the constant C. Furthermore, at the time in which the valve is fully open, it becomes $G^*=1$, $A^{*2}=1$, and so constant C becomes 0. Therefore, said equation (3-6) at the time in which the valve is fully open becomes the equation (3-7), and therefore the relational equation (3-8) for an incompressible fluid is obtained.

Figure 10:
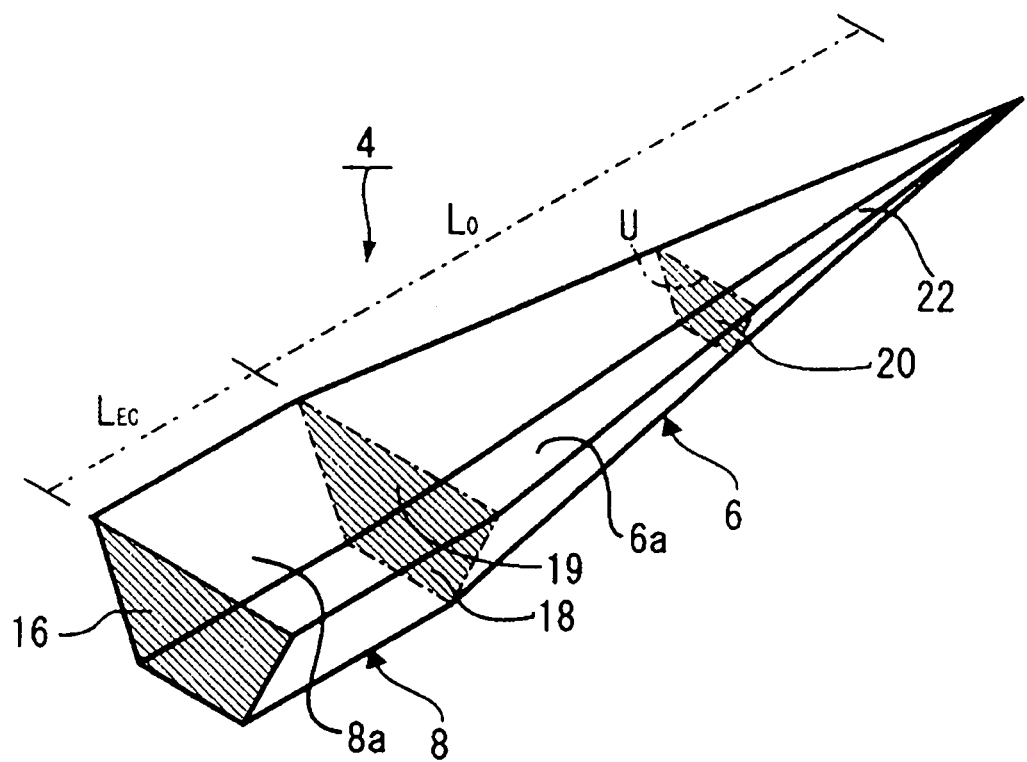
FIG. 10 is a schematic diagram of the throttle groove that has similar cross section forms.

FIG. 10 is a schematic diagram of the throttle groove 4 that have similar cross section forms. As described above, when the cross sections of the throttle groove 4 are similar, the equivalent diameter $D_H$ of the throttle groove 4 is proportional to the power of 0.5 of the cross section area A, and it becomes $D_H \propto A^{0.5}$. Even when the cross section forms are trapezoidal as shown in the figure, only its coefficient varies, and the relation of $D_H \propto A^{0.5}$ holds.

Therefore, as indicated by the equation (3-9) in FIG. 9, $(A_E D_{HE}^2)/(AD_H^2)$ at the right hand side of the equation (2-4) becomes $1/A^{*2}$. When the equation (3-9) is substituted into the equation (2-4), the relational equation (3-10) that yields the critical length for similar cross section forms is obtained. Furthermore, in the case where the fluid is incompressible, the relational equation (3-8) for said incompressible fluid is realized for the relational equation (3-10), and therefore the relational equation (3-11) for incompressible fluids and similar cross section forms is obtained.

FIG. 11 is a classification figure of the critical length in the case where the valve characteristic is of the linear type. $G^*$ and $(dG^*/dL^*)$ are included in said relational equation (2-4), and the relation between $G^*$ and $L^*$ is determined by the desired valve characteristic. As the representative valve characteristics, there are the linear type and the equal percentage type. Of these two types of valve characteristic, the case of the linear type is explained first.

In the case in which the valve characteristic is of the linear type, the dimensionless flow rate $G^*$ is given by $$G^*=G_0^*+(1-G_0^*)\cdot L^* \tag{4-1}$$

Here, $G_0^*$ is the value of $G^*$ when $L^*=0$, and the following relation holds with the rangeability $R_A$.

$$G_0^*=1/R_A \tag{4-2}$$

In the case where the finishing end of said main throttle groove has an ideal form, the flow rate at the vicinity of the full opening state converges continuously toward 0. However, it is impossible to construct such finishing end form in reality. When the valve characteristic is expressed by an equation, the initial flow rate $G^*_0$ or the rangeability $R_A$ is introduced. The valve characteristic of said linear type is expressed as $$G^*=1/R_A+(1-1/R_A)\cdot L^* \tag{4-3}$$

by using the rangeability $R_A$. When $(dG^*/dL^*)$ of the equation (4-3) is solved for, it becomes $$(dG^*/dL^*)=(1-1/R_A) \tag{4-4}$$

When the equations (4-3) and (4-4) are substituted into the relational equation (2-4), the general relational equation (4-5) is derived for the critical length for the valve characteristic of the linear type that does not limit the type of the fluid and the form of the throttle groove.

In the case where said main throttle valve has similar cross section forms, when the equations (3-9), (4-3), and (4-4) are substituted into said relational equation (2-4), the relational equation (4-6) is obtained for the critical length for similar cross section forms for the valve characteristic of the linear type. Furthermore, when it is limited to incompressible fluids/similar cross section forms, by substituting the equation (4-4) to the relational equation (3-11) of said critical length, the relational equation (4-7) is derived for incompressible fluids/similar cross section forms for the valve characteristic of the linear type. In addition, in the case for incompressible fluids/similar cross sections, for an entrance throttle groove that has the critical length $L_{EC}$, the cross section area of the main throttle groove has the relation such that $$A^*=1/R_A+(1-1/R_A)\cdot L^* \tag{4-8}$$

Furthermore, when the rangeability is infinitely large, from said relational equation (4-7), the critical length $L_{EC}$ becomes $$L_{EC}=L_0 \tag{4-9}$$

Therefore, to impart the valve characteristic of the linear type to a minute flow rate controller that manipulate an incompressible fluid, it is suitable that the cross section forms of the main entrance groove be made similar, and its length $L_0$ and the critical length $L_{EC}$ of the entrance throttle groove be made equal.

Figure 12:
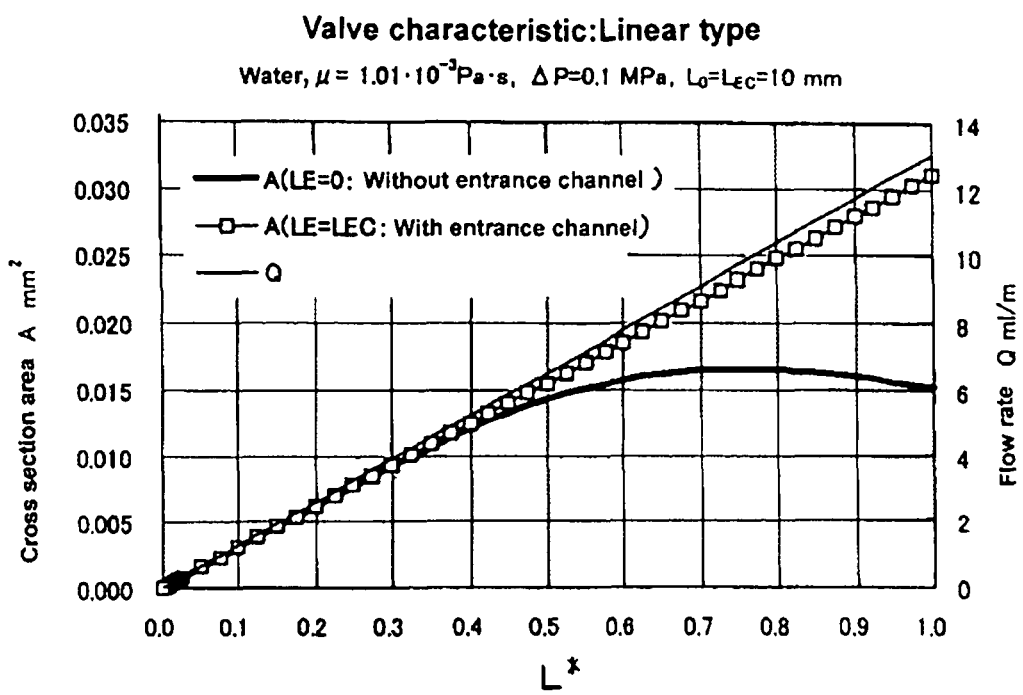
FIG. 12 is a correlation diagram of the cross section area A and the flow rate Q of the main throttle groove in a minute flow rate controller, to which the valve characteristic of the linear type is imparted.

FIG. 12 is a correlation diagram of the cross section area A and the flow rate Q of the main throttle groove in the minute flow rate controller, to which the valve characteristic of the linear type is imparted. The fluid is water whose viscosity is $1.01\times10^{-3}$ Pa·s, the differential pressure between the inflow port and the outflow port is made to be 0.1 MPa, the length $L_0$ of the main throttle groove is made to be 10 mm, the cross section forms are similar semicircles, and the rangeability is set to be infinitely large. That is to say, in the case where the condition for incompressible fluid/similar cross sections is fulfilled, it is designed so that by sliding said flow rate regulating slider from the full closing state of the flow outflow port ($L^*=0$) to the full opening state ($L^*=1$), said flow rate Q changes linearly from 0 to the maximum flow rate.

In order to accomplish the previously stated design objective, as the critical length $L_{EC}$ of the entrance throttle groove, it is calculated by using the equation (4-7) for the case for incompressible fluid/similar cross section forms. However, in this case, because the rangeability is made to be infinitely large, said critical length $L_{EC}$ is made to be of equal length to $L_0$ from the equation (4-7). In other words, it is set to 10 mm. As it is clear from the figure, by forming an entrance throttle groove that has said critical length, the valve characteristic of the linear type of high precision can be imparted upon the minute flow rate controller just by linearly increasing the cross section A(mm$^2$) of said main throttle groove.

On the other hand, in the case of absence of an entrance throttle groove ($L_E=0$) which is indicated by the bold line, said cross section area A (bold line) increases monotonically along with the increase of said lift $L^*$ up to the vicinity of $L^*=0.5$. However, in order to realize said valve characteristic of the linear type, it is necessary that said cross section area A is decreased and reduced as the full opening state ($L^*=1$) is approached, and it has the maximum value of the cross section area at the vicinity of the dimensionless lift $L^*=0.7$. Therefore, in a minute flow rate controller without an entrance throttle groove, there is the enlarged portion in the main throttle groove. In order to form on the valve member a minuscule main throttle groove that has such enlarged portion, an extremely high processing technique is required, and at the same time, it is extremely difficult to form a throttle groove that can supply the flow rate with stability and high precision.

Figure 13:
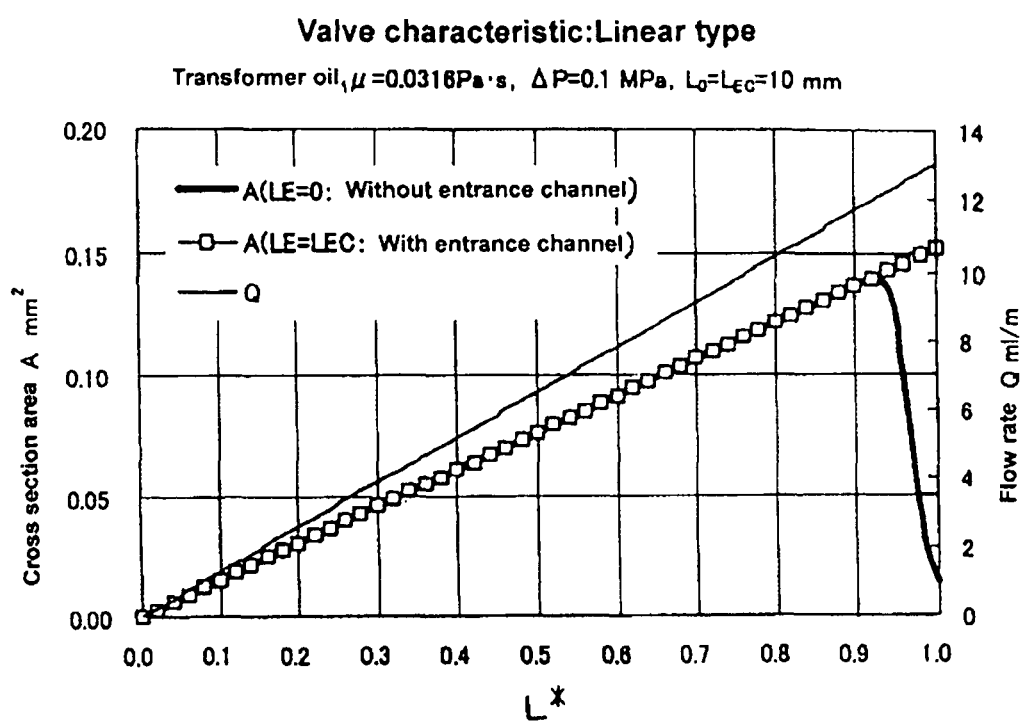
FIG. 13 is a correlation diagram of the cross section area A and the flow rate Q of the main throttle groove in a minute flow rate controller to which the valve characteristic of the linear type is imparted.

FIG. 13 is a correlation diagram of the cross section area A and the flow rate Q of the main throttle groove in a minute flow rate controller to which the valve characteristic of the linear type is imparted. The fluid is the case where the viscosity is about 30 times greater than the previously discussed water (for example, transformer oil of $3.16 \times 10^{-2}$ Pa·s), and the other conditions are set to the same values as in the case where water in FIG. 12 was used. In other words, the differential pressure between said input flow and output flow is 0.1 MPa, the length $L_0$ of the main throttle groove is 10 mm, the cross sections have similar semicircular forms, and the rangeability is set to be infinitely large. The flow rate Q that flows out of said minute flow rate controller also increases linearly as the dimensionless lift $L^*$ changes from 0 to 1, and said main throttle groove has the valve characteristic of the linear type.

Here, the length $L_E$ of the entrance throttle groove is set to be the critical length $L_{EC}$, and the rangeability is set to be infinitely large under the condition of incompressible fluid/similar cross section forms, and therefore, by the equation (4-7), said critical length $L_{EC}$ is set to 10 mm, the equal length as $L_0$. As it is clear from the figure, even in the case where transformer oil is used, whose viscosity is greater than that of water by an order or more of magnitude, by forming an entrance throttle groove with said critical length, a valve characteristic of the linear type of high precision is imparted upon the minute flow rate controller, through the throttle groove that has a simple structure.

Figure 23:
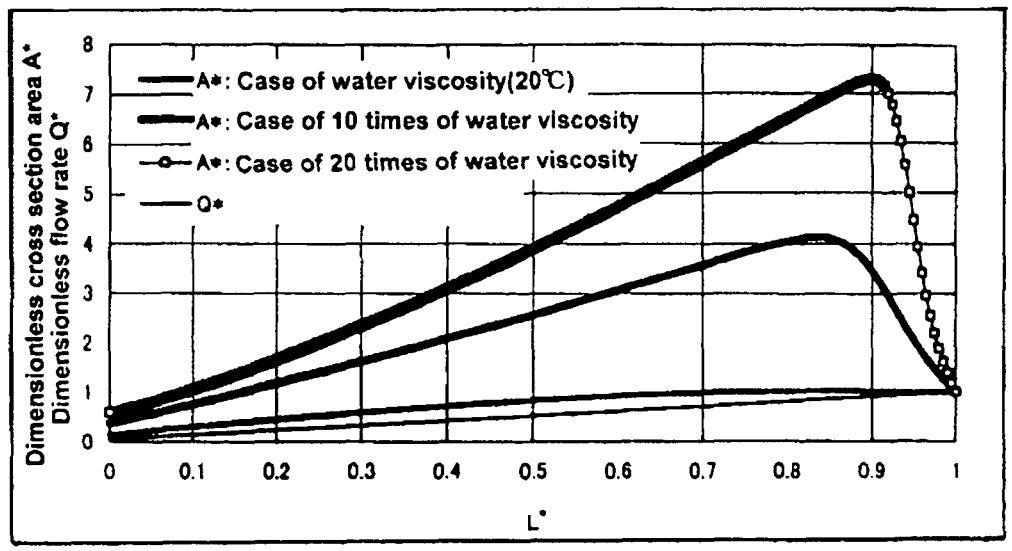
FIG. 23 is a correlation diagram that indicates the effect of the quantity of the fluid viscosity on the relation between the cross section area of the throttle groove and the flow rate with respect to the lift, in a conventional minute flow rate controller not equipped with an entrance throttle groove.

On the other hand, in the case of absence of an entrance throttle groove as indicated by the bold line, said cross section area A (bold line) increases monotonically with the increase of said lift $L^*$ up to the vicinity of $L^*=0.9$. However, as the fully opening state ($L^*=1$) is approached, the cross section of the main throttle groove suddenly decreases. Such sudden change of the cross section of the main throttle groove is caused by the fact that the viscosity of the transformer oil is greater (cf. FIG. 23, see below), compared to the case of water indicated in FIG. 12. Therefore, the minute flow rate controller of the present invention, by being equipped with an entrance throttle groove set at said critical length, does not change suddenly the cross section area of the main throttle groove, and can impart the desired valve characteristic even in the case where it controls the flow rate of a fluid with high viscosity.

Figure 14:
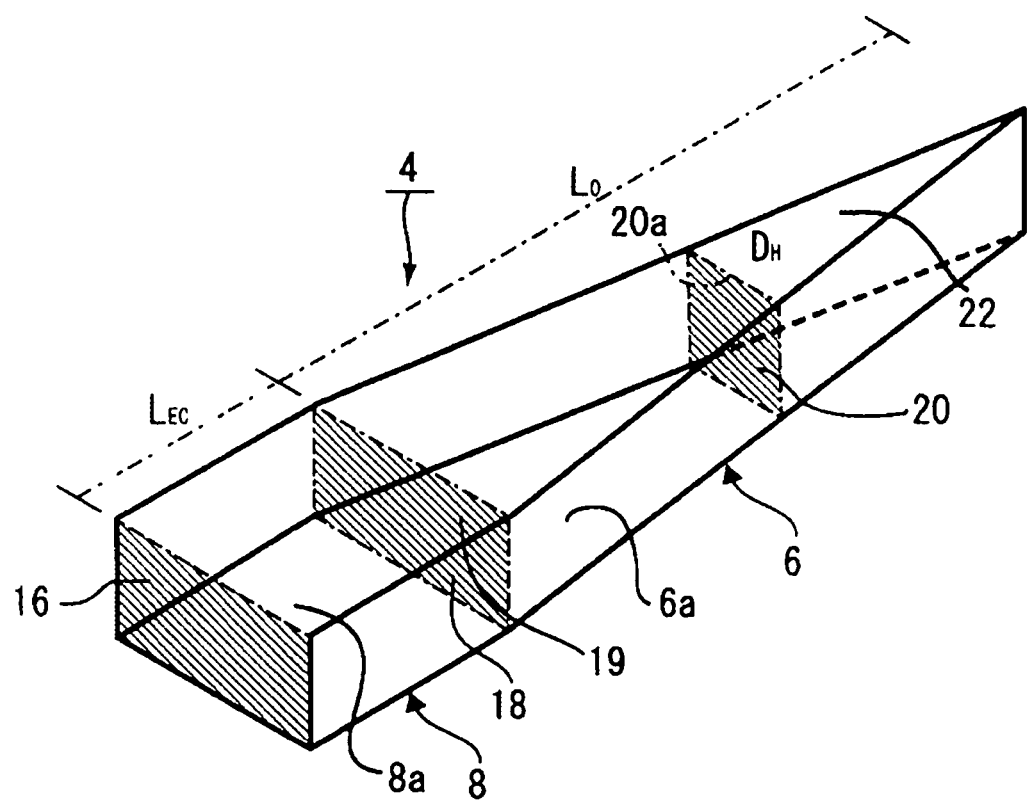
FIG. 14 is a schematic diagram of a throttle groove having non-similar cross sections.

FIG. 14 is a schematic diagram of a throttle groove having non-similar cross sections. The throttle groove 4 comprises cross sections of rectangular form. Its height is constant, and width W of the throttle groove decreases along the flow direction. That is to say, the cross section of the fluid outflow port 20 changes to a non-similar form as the flow rate regulating slider slides. Therefore, in order to determine the critical length, it must be derived from relational equation (4-5) shown in FIG. 13. However, in said relational equation (4-5), $L_{EC}$ is a function of the cross section area A, the equivalent diameter $D_H$, and the dimensionless lift $L^*$. This means even if $L_{EC}$ is changed with the degree of opening of the valve, or if the relation between the cross section A, the equivalent diameter $D_H$, and the dimensionless lift $L^*$ is determined such that $L_{EC}$ becomes a constant, an indefiniteness remains for the value of $L_{EC}$, and it is impossible to determine the value of $L_{EC}$ uniquely.

As indicated in FIG. 13, the significance of equipping an entrance throttle groove set to said critical length $L_{EC}$ is that when the cross section area of the throttle groove increases suddenly in the vicinity of $L^*=1$, this can be avoided. Therefore, in the case where said the cross sections of said main throttle groove is non-similar, when $L^*=1$ is set, and the other parameters are assumed to take the values at $L^*=1$, the length obtained from said relational equation (4-5) is called the quasicritical length $L_{EC}$, and the length of the entrance throttle groove is determined by the quasicritical length $L_{EC}=L_0/(1-1/R_A)$.

Figure 15:
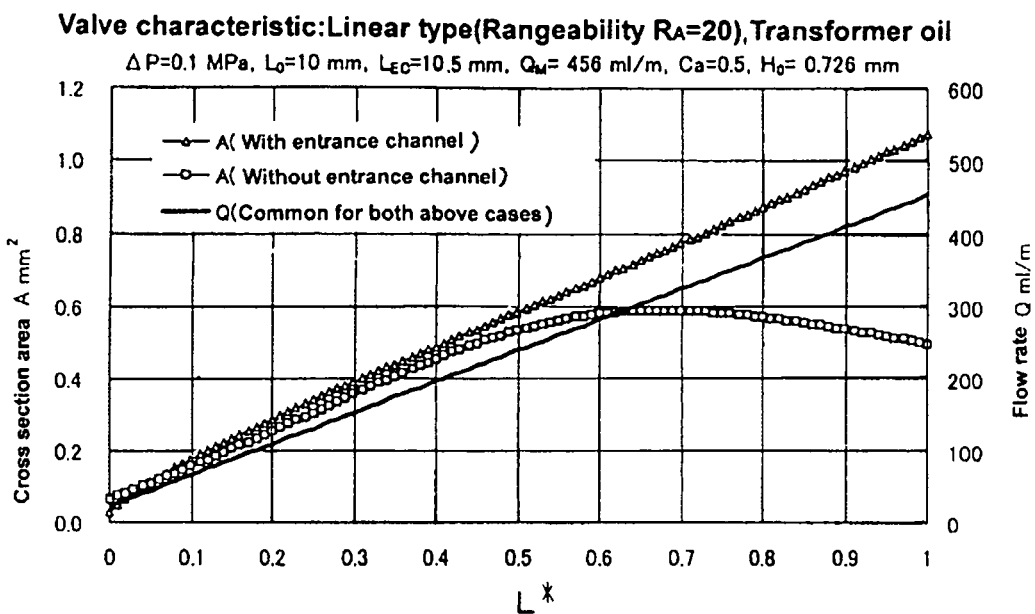
FIG. 15 is a correlation diagram of the cross section area A and the flow rate Q for a minute flow rate controller in which the length of the entrance throttle groove of the present invention is set to the quasicritical length $L_{EC}$.

FIG. 15 is a correlation diagram of the cross section area A and the flow rate Q for a minute flow rate controller in which the length of the entrance throttle groove of the present invention is set to the quasicritical length $L_{EC}$. The fluid is transformer oil whose viscosity is $3.16 \times 10^{-2}$ Pa·s, the differential pressure between the inflow port and the outflow port is 0.1 MPa, the length $L_0$ of the main throttle groove is 10 mm, the quasicritical length $L_{EC}=10.5$ mm, the maximum flow rate $Q_M=456$ ml/m, the cross section forms are non-similar rectangles as shown in FIG. 14, and the rangeability $R_A$ is 20. Furthermore, as for the main throttle groove, the valve characteristic is set for the purpose of flow rate Q becoming of the linear type (solid line within figure).

In the case that the length of said entrance throttle groove is set to the quasicritical length $L_{EC}$ (Δ), the cross section area A increases monotonically with the lift $L^*$. Therefore, by setting the length of the entrance groove to said quasicritical length, an appropriate flow resistance is applied to the fluid, and the need for suddenly increasing the throttle groove is avoided. On the other hand, in the case of absence of an entrance throttle groove ($L_E=0$) (□), the cross section area A of the main throttle groove increases monotonically with the increase of said lift $L^*$ up to the vicinity of $L^*=0.5$; however, the cross section of the main throttle groove decreases as the fully opening state ($L^*=1$) is approached. Therefore, using the quasicritical length at the fully opening state ($L^*=1$) is effective for determining the length of said entrance throttle groove, when said main throttle groove is non-similar.

FIG. 16 is a classification figure of the critical length when the valve characteristic is of the equal percentage (EQ) type. Next, as the desired valve characteristic, the case of the equal percentage type is explained in detail. In the case where the valve characteristic is of the equal percentage type, the dimensionless flow rate G* is given by $$G = G_0^{*1-L*} = (1/R_A)^{1-L*} \quad (4\text{-}10)$$

and when (dG*/dL*) is derived from this equation (4-10), it becomes $$(dG^*/dL^*) = -G^* \cdot \ln G_0^* = G^* \ln(R_A) \quad (4\text{-}11)$$

When this equation (4-11) is substituted into the equation (2-4), the general relational equation (4-12) that does no limit the type of the fluid and the form of the throttle groove is derived for critical length for the equal percentage type valve characteristic shown in FIG. 16. By the same method as in the linear type, the relational equations (4-13) and (4-14) of FIG. 16 are obtained.

When the valve characteristic is of the equal percentage type, as for $L_{EC}$, the critical length $L_{EC}$ has become a function of L* in all cases for the general cross section form, incompressible fluid, and/or similar forms. Therefore, even for the equal percentage type valve characteristic, $L_{EC}$ at the time of full opening (L*=1) is used as the quasicritical length. The quasicritical length $L_{EC}$ in the case of the equal percentage type becomes $$L_{EC} = L_0 / \ln(R_A) \quad (4\text{-}15)$$

Adopting said quasicritical length of the entrance throttle groove is reasonable and effective, regardless of the similarity or non-similarity of the cross section forms, or regardless of the presence or absence of the noncompressibility/compressibility of the fluid.

Figure 17:
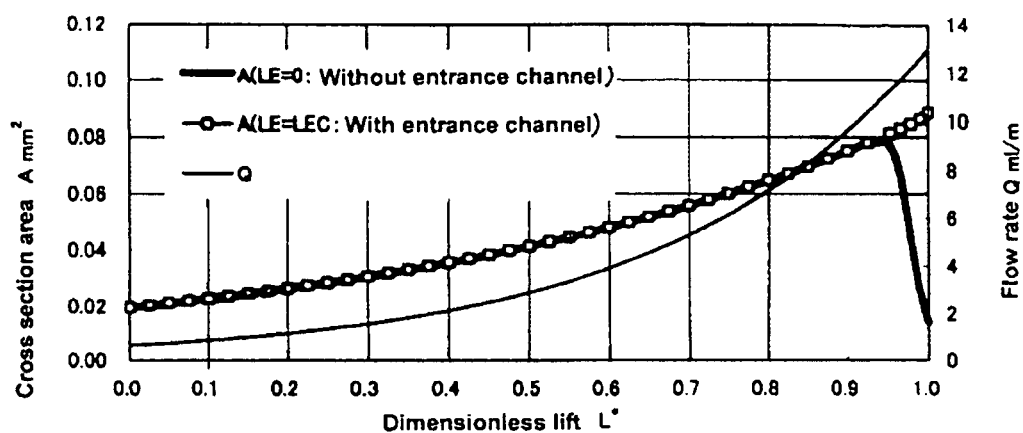
FIG. 17 is a correlation diagram of the cross section area A and the flow rate Q of the main throttle groove in a minute flow rate controller to which the valve characteristic of the equal percentage type is imparted.

FIG. 17 is a correlation diagram of the cross section area A and the flow rate Q of the main throttle groove in a minute flow rate controller to which the valve characteristic of the equal percentage type is imparted. The fluid is transformer oil whose viscosity is $3.16 \times 10^{-2}$ Pa·s, the differential pressure between the inflow port and the outflow port is 0.1 MPa, the critical length of the entrance throttle groove is such that $L_{EC}$=3.34 mm, and the length $L_0$ of the main throttle groove is set at 10 mm. Furthermore, a cross-section comprises semicircles that are similar, and the rangeability $R_A$ is set to 20.

From the valve characteristic of equal percentage type, as for the flow rate Q, the proportion of increment is becoming gradually larger in an exponential manner with the increase of the dimensionless lift L*, as indicated by the equation (4-10). The length of the entrance throttle groove is determined from the relational equation (4-15) for the quasicritical length in the equal percentage type valve characteristic. When this entrance throttle groove is formed, the cross section area A of said main throttle groove (□) increases monotonically, and the valve characteristic of the equal percentage type is imparted upon the minute flow rate controller by the throttle groove with a simple structure.

On the other hand, in the case of absence of an entrance throttle groove ($L_E$=0) as indicated with the bold line, said cross section area A (bold line) monotonically increases with the increase in said lift L*, up to the vicinity of L*=0.9. However, the cross section area A takes on the maximum value in the vicinity of L*=0.95, and the cross section area suddenly decreases. That is to say, the cross section area of the main throttle groove must be increased suddenly from the starting end position. To form such suddenly increasing portion on a throttle groove, it is regarded that a very high processing technique is required.

Figure 18:
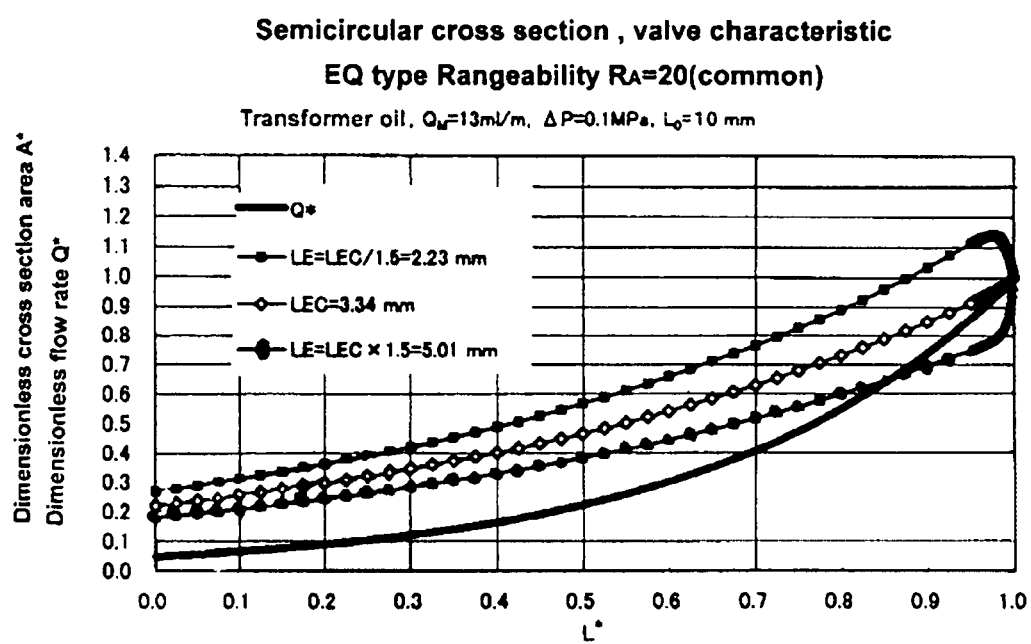
FIG. 18 is a correlation diagram between the dimensionless cross section area A* and the dimensionless flow rate Q* of the main throttle groove in a minute flow rate controller to which the valve characteristic of the equal percentage type is imparted.

FIG. 18 is a correlation diagram between the dimensionless cross section area A* and the dimensionless flow rate Q* of the main throttle groove in a minute flow rate controller to which the valve characteristic of the equal percentage type is imparted. This figure indicates the correlation between the dimensionless cross section area A* and dimensionless flow rate Q* for different lengths of the entrance throttle groove: the case in which the length of said entrance throttle groove is the quasicritical length $L_{EC}$ that is determined by the equation (4-15) (<>:$L_{EC}$=3.34 mm), the case in which this length is shorter than the quasicritical length $L_{EC}$ (■:$L_E$=2.23 mm), and the case in which this length is longer than the quasicritical length $L_{EC}$ (●:$L_E$=5.01 mm). That is to say, it probes what kind of differences occurs between entrance throttle grooves whose lengths are the quasicritical length, 1/1.5 of this, and 1.5 times this. The fluid is transformer oil whose viscosity is 0.0316 Pas, the differential pressure between the inflow port and the outflow port is 0.1 MPa, the length L.sub.0 of the main throttle groove is 10 mm, and the rangeability $R_A$ is 20. As it is clear from the figure, even when said entrance throttle groove is formed, the dimensionless cross section area A* does not become a monotonical change when its length differs from the critical length determined from the equation (4-15). When it is shorter than the critical length, it is necessary to increase the cross section area A* of the main throttle groove suddenly; when it is longer than the critical length, said cross section area A* must be decreased suddenly.

Figure 19:
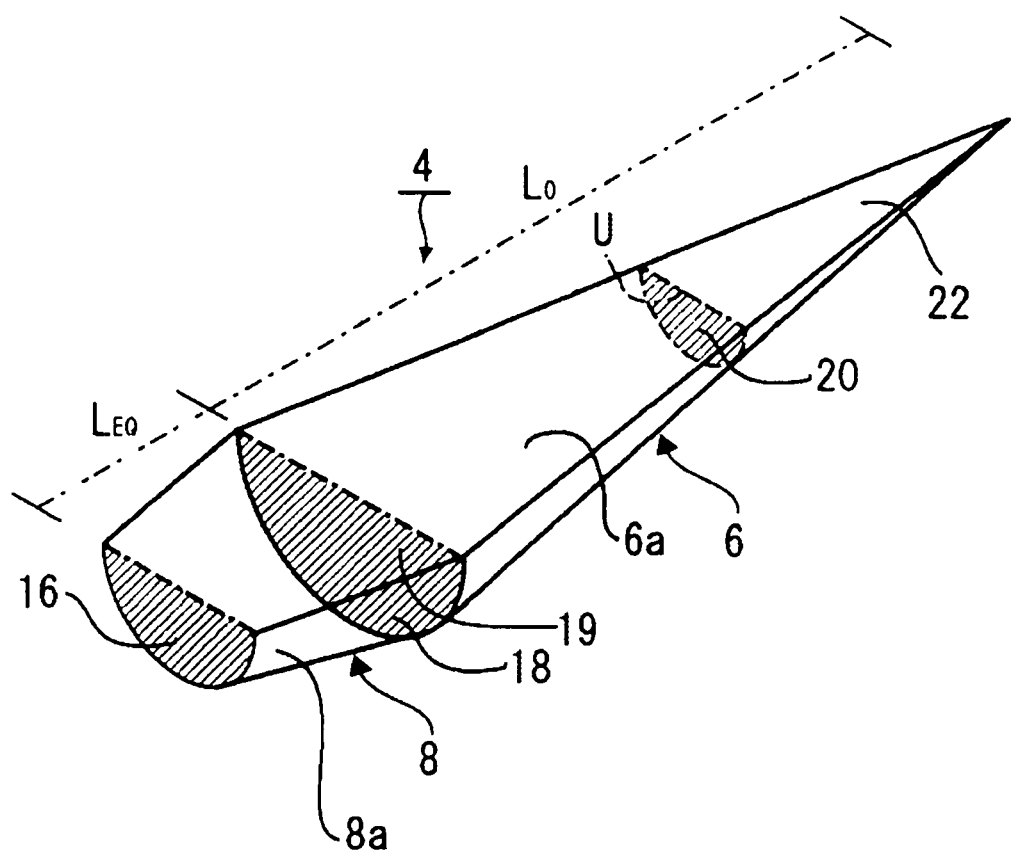
FIG. 19 is a schematic diagram of the throttle groove having a shortened entrance throttle groove.
Figure 21:
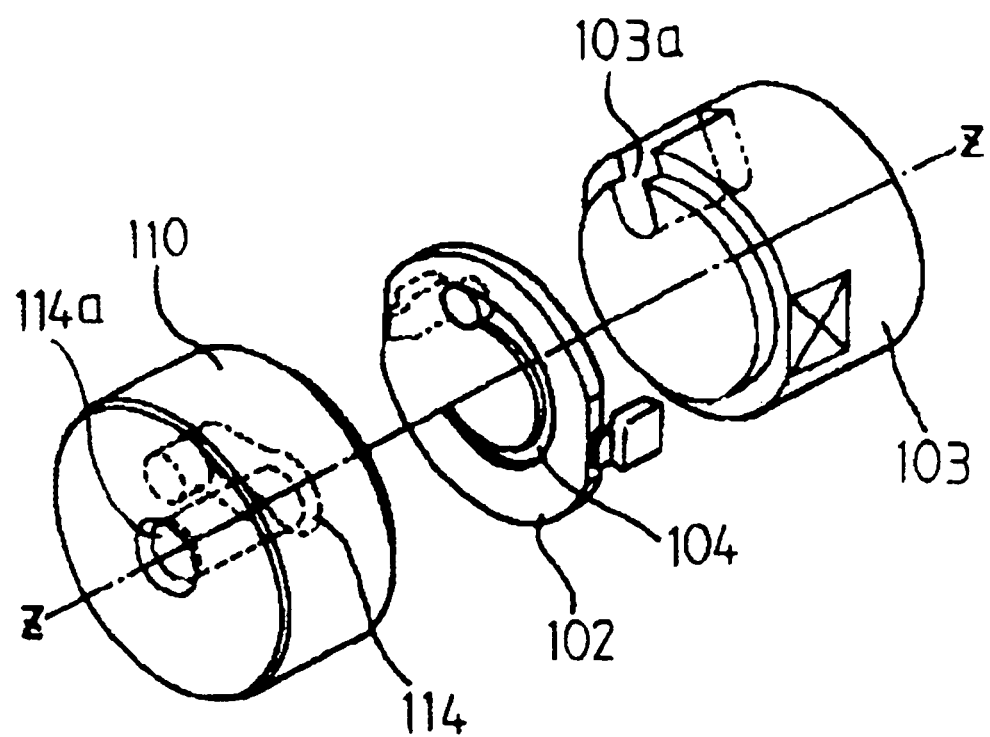
FIG. 21 is an exploded perspective assembly view of the conventional flow control valve.
Figure 22:
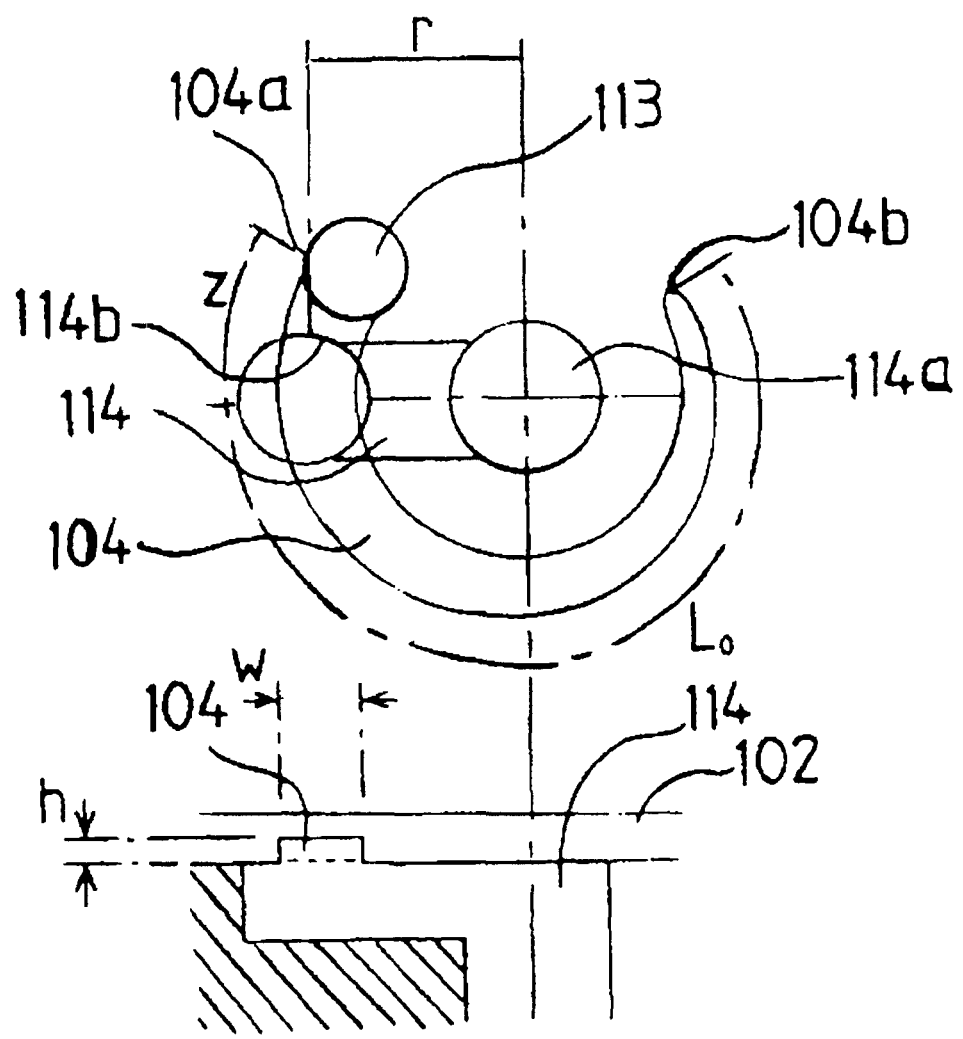
FIG. 22 is a plan view of the throttle groove 104 formed on the metal valve in FIG. 21.

FIG. 19 is a schematic diagram of the throttle groove 4 having the shortened entrance throttle groove 8. For said entrance throttle groove, the flow resistance by this entrance throttle groove 8 is increased, and the length of said entrance throttle groove 8 is shortened, by forming said entrance throttle groove in a tapered manner so that the cross section area $A_{EQ}$ of the starting end cross section 16 is smaller than the cross section area $A_E$ of the finishing end cross section 19. The length of this shortened entrance throttle groove is defined as $L_{EQ}$.

As for the method for determining the cross section area $A_{EQ}$ and length $L_{EQ}$ necessary to generate, at said entrance throttle groove 8, the frictional pressure drop $\Delta P_{EF}$ which is equivalent to an entrance throttle groove of the length $L_{Ec}$ having the uniform cross section area $A_E$, it is subsequently explained by taking as an example the case in which the cross section forms are semicircular forms. FIG. 20 is a process chart for deriving the length of the shortened entrance throttle groove of the present invention. The frictional pressure drop dP at the minute section dz of an entrance throttle groove having the cross section area A assumes the form of the equation (5-1) of FIG. 20. Here, the flow velocity u, the friction coefficient λ, and the equivalent diameter $D_H$ being given, when the following relational equations that have been previously described, $$u = G/(\rho A) \quad (2)$$

$$\lambda = 64 \mu A/(G D_H) \quad (5)$$

$$D_H = \{(2\pi)^{0.5}/(1+\pi/2)\} A^{0.5} \quad (15)$$

are substituted into the equation (5-1), the equation (5-2) is obtained. When this equation (5-2) is integrated along the entire length of the entrance throttle groove, the equation (5-3) describing the frictional pressure drop $\Delta P_{EQ}$ in the entrance throttle groove is obtained. Here, when it is assumed that the cross section area A varies linearly toward the flow direction coordinate z, then said cross section area A is given by the equation (5-4). When its differentiated equation, the equation (5-5), is used for transforming the variable of the equation (5-3), and then integration is carried out, the final frictional pressure drop equation (5-6) is obtained. Similarly, the equation (5-7) that gives the frictional pressure drop $\Delta P_E$ when the cross section area of the entrance throttle groove is uniform is obtained. By equalizing this pressure drop $\Delta P_E$ and the previously determined $\Delta P_{EQ}$, the equation (5-8) that gives the length of the shortened entrance throttle groove from the equations (5-6) and (5-7) is obtained. As this equation (5-8) makes clear, by decreasing the cross section area of the entrance throttle groove toward the starting end cross section, the length of the entrance throttle groove can be shortened by a factor of $(A_{EQ}/A_E)$, compared to the case in which the cross section area $A_E$ is constant.

The present invention is not limited to the embodiments described above. Various modifications, design alterations, and others that do not involve a departure from the technical concept of the present invention are also included in the technical scope of the present invention.

INDUSTRIAL APPLICABILITY

According to the method for designing a minute flow rate controller of the present invention, a minute flow rate controller of high precision required upon developing microchemical processing technology which is attracting attention in recent years in synthetic chemistry, analytical chemistry, semiconductor industry and biotechnology industry, for uses for immunoassay system, environmental analysis system, cell biochemistry experimental system, chemical vapor growth system and synthetic chemistry experimental system, can be designed. Furthermore, through the increase in reaction yield, the shortening of reaction time, and the reduction of burden to the environment, the control of chemical reactions can be made highly precise and efficient. In addition, microminiaturization and integration of chemical reaction systems that require minute and precise flow rate control, which is impossible with the existing technology, can be realized.

The invention claimed is:

1. A minute flow rate controller equipped with an entrance throttle groove, said minute flow rate controller comprising an inflow passage for introducing a fluid, a valve member on which a main throttle groove is formed, for flowing the fluid introduced from said inflow passage from a starting end to a finishing end, a flow rate regulating component that hermetically seals said main throttle groove up to a desired position, a fluid outflow port that opens by said flow rate regulating component at a given cross section of said main throttle groove, an outflow passage that lead out the fluid that flows out of said fluid outflow port, and an entrance throttle groove that precedes connectively at the starting end of said main throttle groove, wherein in order to determine theoretically a length $L_E$ of said entrance throttle groove by flow theory, a momentum equation of said fluid flowing through said entrance throttle groove and said main throttle groove is expressed as $u\rho du/dz + \lambda u^2 \rho/2D_H + dP/dz = 0$, said momentum equation is computed based upon $u = G/\rho A$ and $\lambda = 64 \mu A/GD_H$, said momentum equation is also computed under a condition that a pressure difference of said fluid between said inflow passage and said outflow passage is constant, said length $L_E$ of said entrance throttle groove is determined so that when a cross section area of said main throttle groove monotonically decreases from the starting end to the finishing end, a flow rate of the fluid that flows out from said fluid outflow port monotonically decreases, as the position of said fluid outflow port moves from the starting end to the finishing end, and said length $L_E$ which is theoretically determined above is used as said length of entrance throttle groove, where u is the flow velocity of said fluid, $\rho$ is the density of said fluid, z is the flow direction coordinate of said fluid, $\lambda$ is the friction coefficient of said fluid, $D_H$ is the equivalent diameter of throttle groove cross section area, P is the pressure of said fluid, G is the mass flow rate of said fluid, A is the cross section area of said fluid outflow port, and $\mu$ is the viscosity coefficient of said fluid.

2. The minute flow rate controller equipped with an entrance throttle groove according to claim 1, wherein a critical length $L_{EC}$ of the entrance throttle groove is defined as the length $L_E$ when the term of
$32 \mu L_0/AD_H^2 - 32 \mu L_E (dG^*/dL^*)/A_E D_{HE}^2 G^{*2}$ appeared in said momentum equation is put to be zero, and the critical length $L_{EC}$ is given by $L_{EC} = L_0 (A_E D_{HE}^2/AD_H^2) G^{*2}/(dG^*/dL^*)$, where the length of said main throttle groove is $L_0$, the finishing end position of said main throttle groove is set at $L=0$, the position of the fluid outflow port is set at $L=L$, the starting end position is set at $L=L_0$, the mass flow rate when the fluid outflow port is located at $L=L_0$ is set at $G_M$, the mass flow rate when the fluid outflow port is located at $L=L$ is set at G, the dimensionless lift $L^*$ is defined as $L^* = L/L_0$, the dimensionless mass flow rate $G^*$ is defined as $G^* = G/G_M$, the derivative of $G^*$ for $L^*$ is written as $dG^*/dL^*$, $A_E$ is the cross section area of entrance throttle groove, $D_{HE}$ is the equivalent diameter of the entrance throttle groove cross section.

3. The minute flow rate controller equipped with an entrance throttle groove according to claim 2, wherein said critical length $L_{EC}$ is given by $L_{EC} = L_0 (A_E D_{HE}^2/AD_H^2) \{1/R_A + (1 - 1/R_A)L^*\}^2/(1 - 1/R_A)$ whenever the valve characteristic is of the linear type, and is expressed as $G^* = G_0^* + (1 - G_0^*)L^*$, where the mass flow rate when the fluid outflow port is located at $L=0$ is set at $G_0$, $G_0^*$ is defined as $G_0^* = G_0/G_M$, namely the value of $G^*$ at $L^* = 0$, and the rangeability $R_A$ is defined as $G_O^* = 1/R_A (1 \leq R_A \leq \infty)$.

4. The minute flow rate controller equipped with an entrance throttle groove according to claim 2, wherein said critical length $L_{EC}$ is given by the natural logarithm ln as $L_{EC} = L_0 (A_E D_{HE}^2/AD_H^2)(1/R_A)^{(1-L^*)/\ln R_A}$ whenever the valve characteristic is of the equal percentage type that is expressed as $G^* = G_0^{*(1-L^*)}$, where the mass flow rate when the fluid outflow port is located at $L=0$ is set at $G_0$, $G_0^*$ is defined as $G_0^* = G_0/G_M$, namely the value of $G^*$ at $L^* = 0$, and the rangeability $R_A$ is defined $G_0^* = 1/R_A (1 \leq R_A \leq \infty)$.

5. The minute flow rate controller equipped with an entrance throttle groove as in any one of claims 1, 2, 3 and 4, wherein it is equipped with an entrance throttle groove in which the cross section area of said entrance throttle groove increases monotonically toward the starting end position of said main throttle groove.

6. The minute flow rate controller equipped with an entrance throttle groove according to claim 5, wherein the cross section area $A_E(z)$ of said entrance throttle groove increases linearly along the flow direction coordinate z, and said cross section area $A_E(z)$ is given as $$A_E(z) = A_{EQ} + \{(A_{EO} - A_{EQ})/L_{EQ}\} \cdot z,$$

where $A_{EQ}$ is the starting end cross section area of the entrance throttle groove, $A_{EO}$ is the finishing end cross section area of the entrance throttle groove nearest to the starting end position of said main throttle groove, $L_{EQ}$ is the length of the entrance throttle groove, and z is the flow direction coordinate of the fluid.

7. The minute flow rate controller equipped with an entrance throttle groove according to claim 6, wherein the finishing end position of said main throttle groove is L=0, the starting end position of said main throttle groove is $L=L_0$, the mass flow rate when the fluid overflow port is at L=0 is $G_0$, the flow rate when the fluid overflow port is at $L=L_O$ is $G_M$, $G_0^*$ and $R_A$ are defined by $G_0^* = G_0/G_M$ and $R_A = 1/G_O^*$, and the subsequent length $$L_{EQ} = (A_{EQ}/A_{EO})\{L_O/(1 - G_O^*)\}$$
$$= (A_{EQ}/A_{EO})\{L_O/1 - 1/R_A)\}$$

of the entrance throttle groove, obtained by assuming that the frictional pressure drop inside said entrance throttle groove takes an equivalent quantity to the frictional pressure drop exhibited by an entrance throttle groove with a constant cross section area whose critical length $L_{EC}$, is taken.

* * * * *